US012752542B2

(12) United States Patent
Kondo et al.

(10) Patent No.: US 12,752,542 B2

(45) Date of Patent: Oct. 6, 2026

(54) CARTRIDGE MOUNTABLE TO A PRINTING APPARATUS THAT EJECTS LIQUID ONTO A PRINT MEDIUM FOR PRINTING

(71) Applicant: CANON KABUSHIKI KAISHA, Tokyo (JP)

(72) Inventors: Soji Kondo, Kanagawa (JP); Hiroki Hayashi, Kanagawa (JP); Wataru Takahashi, Kanagawa (JP); Tatsuo Nanjo, Kanagawa (JP); Keisuke Iinuma, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 143 days.

(21) Appl. No.: 18/737,989

(22) Filed: Jun. 8, 2024

(65) Prior Publication Data

US 2025/0010627 A1 Jan. 9, 2025

(30) Foreign Application Priority Data

Jul. 7, 2023 (JP) ................................ 2023-112163

(51) Int. Cl.
*B41J 2/175* (2006.01)

(52) U.S. Cl.
CPC ......... *B41J 2/1753* (2013.01); *B41J 2/17513* (2013.01); *B41J 2/1752* (2013.01); *B41J 2/17553* (2013.01); *B41J 2/17563* (2013.01)

(58) Field of Classification Search
CPC .... B41J 2/1753; B41J 2/17513; B41J 2/1752; B41J 2/17553; B41J 2/17563; B41J 2/17523; B41J 2/19; B41J 2/21
See application file for complete search history.

(56) References Cited

U.S. PATENT DOCUMENTS 5,975,681 A 11/1999 Ogasawara et al. ..... B41J 2/175
6,039,437 A 3/2000 Tsujimoto ................. B41J 2/14
(Continued)

FOREIGN PATENT DOCUMENTS

JP H06126980 A 5/1994
JP 2008-260199 10/2008
(Continued)

OTHER PUBLICATIONS

U.S. Appl. No. 18/628,695, filed Apr. 6, 2024.
(Continued)

*Primary Examiner* — Lisa Solomon
(74) *Attorney, Agent, or Firm* — Venable LLP

(57) ABSTRACT

A cartridge mountable to a printing apparatus that ejects liquid onto a print medium for printing. The cartridge includes a first accommodation chamber accommodating the liquid and a first channel connecting the first accommodation chamber and a printing element board including an element to apply energy for ejecting the liquid. When the cartridge is mounted to the printing apparatus, the first channel includes a first horizontal portion extending along a horizontal direction, a first connection portion connected to the printing element board and extending along a vertical direction, and a first reservoir portion storing a bubble. The first reservoir portion has a tapered portion with an opening portion at an upper end in the vertical direction and an opening portion at a lower end thereof where the cartridge is mounted to the printing apparatus, the opening at the upper end being larger than the opening at the lower end.

23 Claims, 17 Drawing Sheets

(56) References Cited

U.S. PATENT DOCUMENTS

| | | | | |
|---|---|---|---|---|
| 9,289,984 | B2 | 3/2016 | Shimizu et al. | B41J 2/135 |
| 2008/0049080 | A1 | 2/2008 | Hayashi et al. | B41J 2/175 |
| 2008/0252705 | A1 | 10/2008 | Amma et al. | B41J 2/175 |
| 2009/0179979 | A1 | 7/2009 | Nanjo et al. | B41J 2/175 |
| 2009/0244181 | A1* | 10/2009 | Kurobe | B41J 2/17513 347/44 |
| 2011/0096128 | A1 | 4/2011 | Ogura et al. | B41J 2/175 |
| 2012/0200647 | A1 | 8/2012 | Miyashita et al. | B41J 2/175 |
| 2012/0300003 | A1 | 11/2012 | Takada et al. | B41J 2/175 |
| 2013/0222488 | A1 | 8/2013 | Miyashita et al. | B41J 2/175 |
| 2013/0222491 | A1 | 8/2013 | Nanjo et al. | B41J 2/175 |
| 2015/0343793 | A1 | 12/2015 | Takada et al. | B01D 19/00 |
| 2015/0375512 | A1 | 12/2015 | Kondo et al. | B41J 2/175 |
| 2015/0375514 | A1 | 12/2015 | Koshikawa et al. | B41J 2/175 |
| 2016/0200113 | A1 | 7/2016 | Nanjo et al. | B41J 2/175 |
| 2016/0200114 | A1 | 7/2016 | Nanjo et al. | B41J 2/175 |
| 2017/0087863 | A1 | 3/2017 | Miyashita et al. | B41J 2/175 |
| 2017/0120606 | A1 | 5/2017 | Koshikawa et al. | B41J 2/175 |
| 2017/0120608 | A1 | 5/2017 | Takaoka et al. | B41J 2/175 |
| 2017/0120609 | A1 | 5/2017 | Kimura et al. | B41J 2/175 |
| 2017/0120612 | A1 | 5/2017 | Fukuchi et al. | B41J 2/175 |
| 2017/0120613 | A1 | 5/2017 | Ikebe et al. | B41J 2/175 |
| 2017/0136776 | A1 | 5/2017 | Shiba et al. | B41J 2/175 |
| 2017/0151797 | A1 | 6/2017 | Hayashi et al. | B41J 2/175 |
| 2017/0151803 | A1 | 6/2017 | Yoshii et al. | B41J 2/175 |
| 2019/0168508 | A1 | 6/2019 | Kondo | B41J 2/14 |
| 2020/0079096 | A1 | 3/2020 | Linuma et al. | B41J 2/175 |
| 2021/0300052 | A1 | 9/2021 | Takei et al. | B41J 2/175 |
| 2021/0300055 | A1 | 9/2021 | Koshikawa et al. | B41J 2/175 |
| 2021/0362506 | A1 | 11/2021 | Kishikawa et al. | B41J 2/175 |
| 2022/0097388 | A1 | 3/2022 | Nanjo et al. | B41J 2/175 |
| 2023/0302806 | A1 | 9/2023 | Noda et al. | B41J 2/175 |
| 2024/0173986 | A1 | 5/2024 | Omura et al. | B41J 2/175 |
| 2024/0198689 | A1 | 6/2024 | Murase et al. | B41J 2/175 |
| 2024/0286787 | A1 | 8/2024 | Noda et al. | B65D 1/36 |
| 2024/0300245 | A1 | 9/2024 | Hayasaka et al. | B41J 2/175 |

FOREIGN PATENT DOCUMENTS

| | | | |
|---|---|---|---|
| JP | 2009248328 | A | 10/2009 |
| JP | 2011056829 | A | 3/2011 |

OTHER PUBLICATIONS

U.S. Appl. No. 18/752,383, filed Jun. 24, 2024.
U.S. Appl. No. 18/762,423, filed Jul. 2, 2024.
U.S. Appl. No. 18/771,686, filed Jul. 12, 2024.
U.S. Appl. No. 18/778,955, filed Jul. 20, 2024.
U.S. Appl. No. 18/778,960, filed Jul. 20, 2024.
U.S. Appl. No. 18/910,371, filed Oct. 9, 2024.
Extended European Search Report dated Nov. 18, 2024 in counterpart EP Application No. 24181608.1.
Japanese Office Action issued Mar. 17, 2026, in corresponding Japanese Application No. 2023-112163.

* cited by examiner

CARTRIDGE MOUNTABLE TO A PRINTING APPARATUS THAT EJECTS LIQUID ONTO A PRINT MEDIUM FOR PRINTING

BACKGROUND

Claim to Priority

This application claims the benefit of Japanese Patent Application No. 2023-112163, filed Jul. 7, 2023, which is hereby incorporated by reference herein in its entirety.

FIELD OF THE DISCLOSURE

The present disclosure relates to a cartridge and a printing apparatus.

DESCRIPTION OF THE RELATED ART

Printing apparatuses that perform printing by ejecting liquids onto a print medium sometimes use a cartridge in which liquid accommodation chambers and a liquid ejection unit are integrated with each other and which is detachably attachable to the printing apparatus.

Japanese Patent Laid-Open No. 2008-260199 discloses an inkjet printing cartridge (cartridge) including storage units (accommodation chambers) that store liquids and an inkjet print head (ejection unit) that performs printing by ejecting the liquids. Japanese Patent Laid-Open No. 2008-260199 also discloses that supply paths (channels) through which to supply the liquids from the storage units are formed between the accommodation chambers and the ejection unit, and those supply paths are connected to the ejection unit.

The channels in the cartridge of Japanese Patent Laid-Open No. 2008-260199 need to include horizontal portions that extend horizontally in the state where the cartridge is mounted to a printing apparatus. In a case when bubbles are generated in the liquids in the supply paths, the bubbles may stay in those horizontal portions and cannot be easily released from the horizontal portions. In a case when the bubbles are supplied to the ejection unit along with the liquids, it will cause an ejection failure. In order to maintain the ejection performance, a maintenance operation may be performed in which the bubbles are discharged to the outside of the cartridge along with the liquids. Here, the liquids will be wasted in a case when the liquids are frequently discarded along with bubbles.

SUMMARY

Thus, an object of the present disclosure is to provide a cartridge capable of preventing entry of bubbles into its ejection unit and maintaining the ejection performance to a greater extent than the conventional technique.

A cartridge mountable to a printing apparatus capable of performing printing by ejecting a liquid onto a print medium, the cartridge including a first accommodation chamber capable of accommodating the liquid and a first channel connecting the first accommodation chamber and a printing element board including an element configured to apply an energy for ejecting the liquid to the liquid, wherein in a state where the cartridge is mounted to the printing apparatus, the first channel includes a first horizontal portion extending along a horizontal direction, a first connection portion connected to the printing element board and extending along a vertical direction, and a first reservoir portion capable of storing a bubble, and as viewed along an extending direction in which the first horizontal portion extends, a width of the first reservoir portion is larger than a width of the first connection portion.

Further features of the present disclosure will become apparent from the following description of exemplary embodiments with reference to the attached drawings.

DESCRIPTION OF THE EMBODIMENTS

First Embodiment

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

Figure 1:
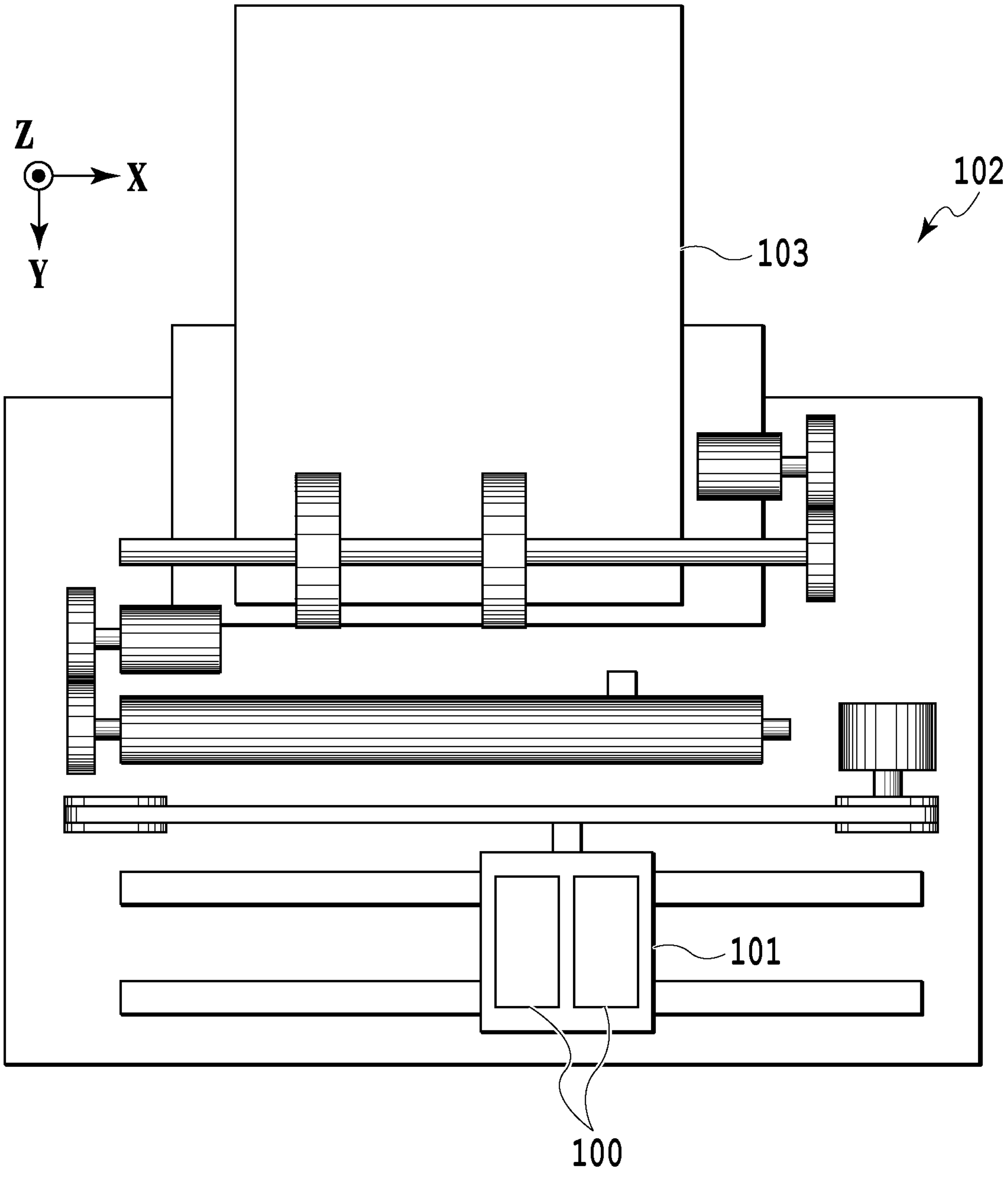
FIG. 1 is a schematic view illustrating one example of an inkjet printing apparatus in one embodiment.

FIG. 1 is a schematic view illustrating an inkjet printing apparatus (hereafter referred to also as "printing apparatus) 102 to which a first embodiment is applicable.

In FIG. 1, the X direction represents the scanning direction of a carriage. The Y direction represents the conveyance direction of a print medium. The Z direction represents the vertically upward direction. Note that the same X, Y, and Z axes as those in FIG. 1 are illustrated in the following drawings for explaining a single cartridge on the assumption that the cartridge is mounted to the printing apparatus. Here, in the state where the cartridge is mounted to the printing apparatus, the longitudinal direction (depth direction) of the cartridge is the Y direction. The transverse direction (width direction) of the cartridge is the X direction. The vertical direction (height direction) of the cartridge is the Z direction.

The printing apparatus 102 is configured such that cartridges 100 can be mounted on a carriage 101. The cartridges 100 mounted on the carriage 101 eject liquids (hereafter referred to also as "inks") onto a print medium 103 while moving relative to it to perform printing. In other words, the printing apparatus 102 is a serial printing apparatus. In the ejection, the cartridges 100 eject the liquids while the carriage 101 moves reciprocally in the X direction. In synchronization with the liquid ejection from the cartridges 100, the print medium 103 is conveyed at intervals of a predetermined distance in a direction crossing (in the present embodiment, perpendicularly crossing) the direction of the reciprocal movement of the carriage 101 (Y direction) to form an image on the print medium 103.

Figure 2:
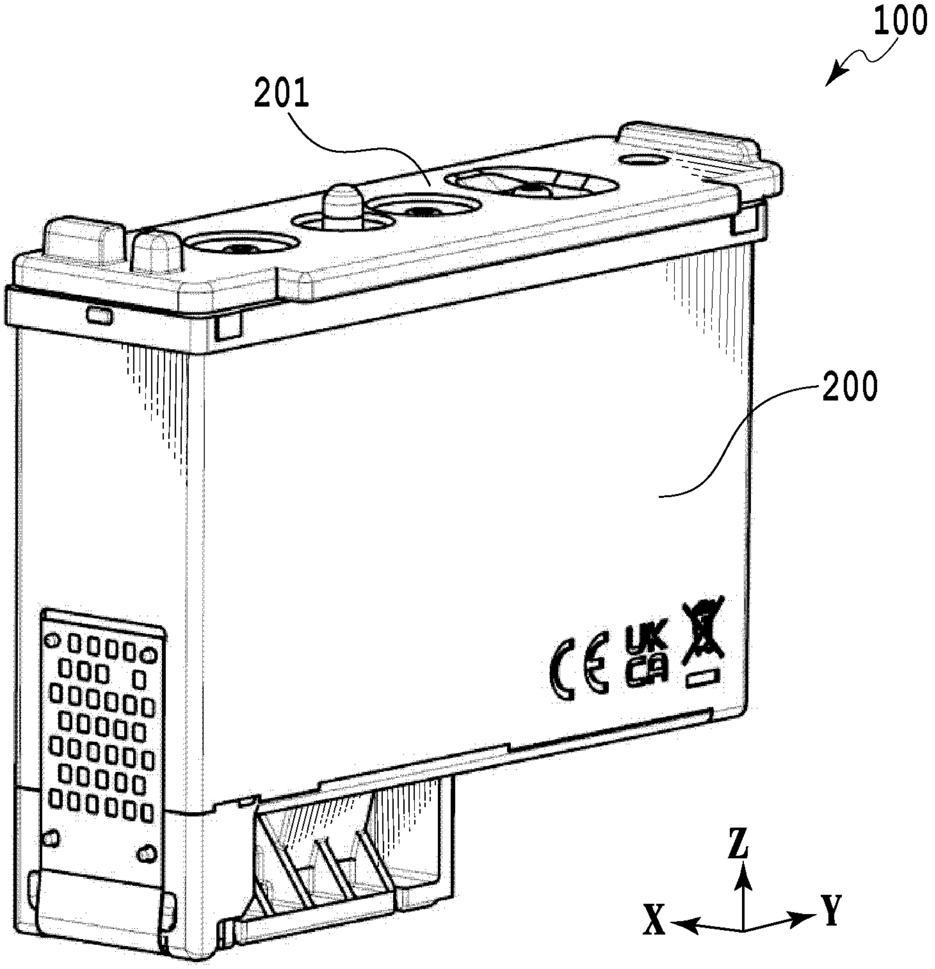
FIG. 2 is a perspective view illustrating one example of a cartridge in the one embodiment.
Figure 3:
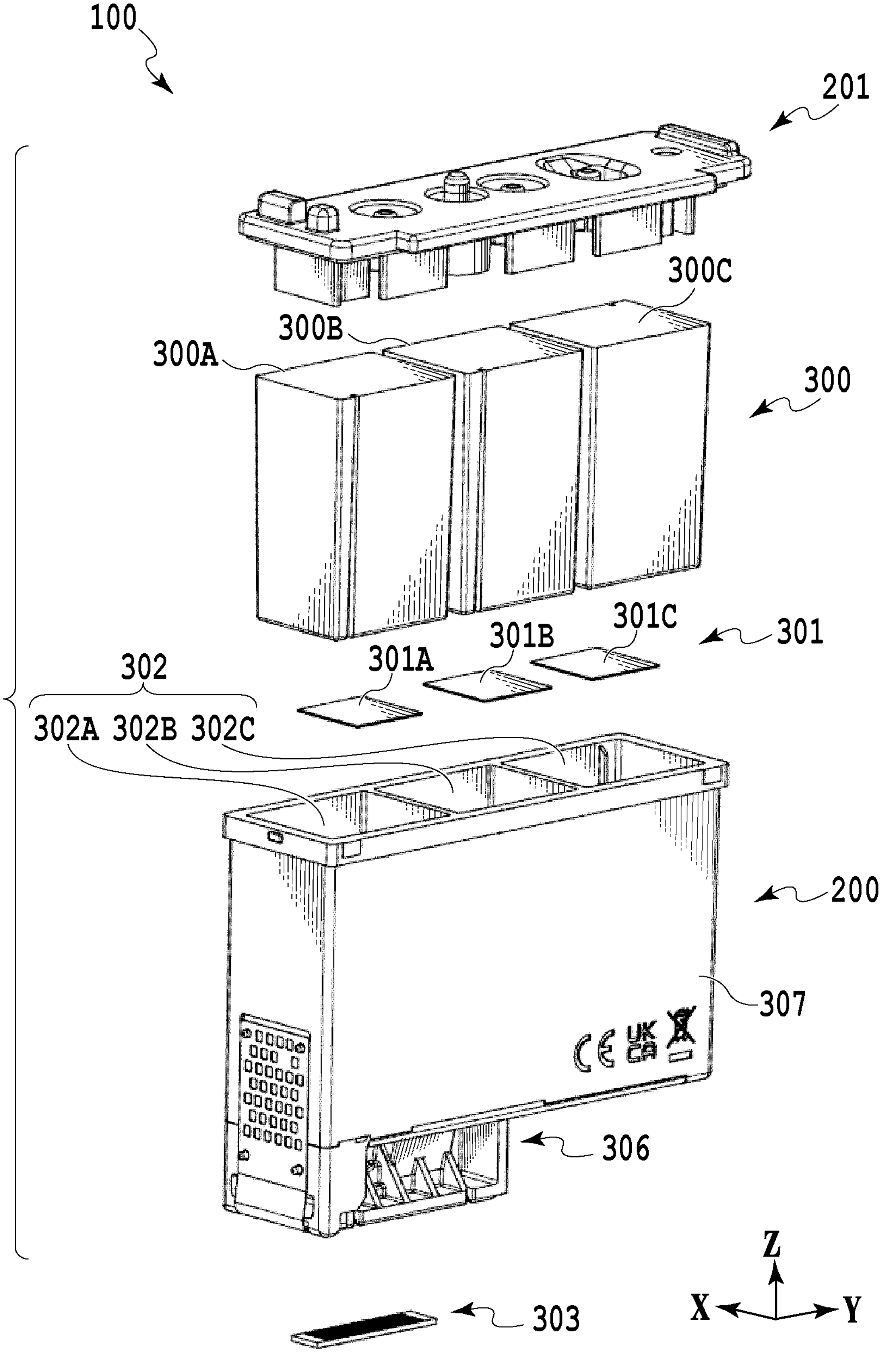
FIG. 3 is an exploded perspective view illustrating the one example of the cartridge in the one embodiment.

FIG. 2 is a perspective view illustrating outer appearance of one of the cartridges 100. FIG. 3 is an exploded perspective view of the cartridge 100. The cartridge 100 includes a printing element board 303 for ejecting the liquids, a case 200 in which accommodation chambers 302 for accommodating the liquids are formed, and a lid 201. Filters 301 and absorbers 300 that hold the liquids to be accommodated are stored in the accommodation chambers 302. The liquids held in the absorbers 300 will be supplied to ejection ports in the printing element board 303 through a channel part (not illustrated in FIGS. 2 and 3) communicating with the accommodation chambers 302. In the present embodiment, the absorbers 300 are inserted in the accommodation chambers 302 as units for generating negative pressures to hold the liquids, but the liquids can be similarly held also with a configuration employing negative pressure generation units such as pressure control units or circulation units.

The accommodation chambers 302 in the present embodiment include a first accommodation chamber 302A capable of accommodating a liquid of a first type, a second accommodation chamber 302B capable of accommodating a liquid of a second type different in type from the liquid of the first type, and a third accommodation chamber 302C capable of accommodating a liquid of a third type different in type from the liquids of the first and second types. The first, second, and third accommodation chambers 302A, 302B, and 302C are disposed straight so as to be adjacent to each other in the depth direction of the cartridge 100 (Y direction).

The liquids accommodated in the accommodation chambers 302 are usually chromatic color inks. Cyan, magenta, and yellow inks are accommodated in the accommodation chambers. Incidentally, while the configuration in which the cartridge 100 includes three accommodation chambers 302 will be exemplarily described in the present embodiment, the present embodiment is not limited to this configuration, and is applicable to cases with two or less or four or more accommodation chambers. For example, the following concept similarly applies to a cartridge accommodating four colors of inks additionally including a black ink.

In FIG. 3, three absorbers 300A, 300B, and 300C for cyan, magenta, and yellow are illustrated. The shapes of the absorbers 300 are desirably close to a cube for the ease of supply of the liquids. Here, in a case of changing the sizes of the absorbers 300 in consideration of the liquid capacities, it is preferable to extend the absorbers 300 in the vertical direction in the postures in which they are used. Increasing the sizes of the absorbers 300 in the scanning direction widens the cartridge 100, which in turn increases the size of the whole apparatus. Also, increasing the sizes of the absorbers 300 in the array direction of the ejection ports (Y direction) lengthens channels from the absorbers 300 to the printing element board 303 and increases the flow resistance in the supply of the liquids, which is not preferable.

The absorbers 300 are made of a fibrous material, a porous material, or the like, and are capable of holding the inks inside with capillary forces acting thereon. The absorbers 300 are stored in the accommodation chambers 302 of the case 200 in abutment with the respective filters 301 serving as dust traps, and the liquids inside the absorbers 300 are supplied to the printing element board 303 through the filters 301 and the channel part.

The printing element board 303 is an ejection unit that ejects the inks, and is disposed on the bottom surface of the case 200 on the lower side in the vertical direction. The printing element board 303 is disposed around the bottoms of the absorber 300A and the absorber 300B and is distant from the absorber 300C. The case 200 has a box part 307 in which the accommodation chambers 302 are formed and a channel formation part 306 protruding downward in the vertical direction from the box part 307. The printing element board 303 is attached to the lower side of the channel formation part 306 in the vertical direction. Specifically, the printing element board 303 includes elements that apply an energy for ejecting the liquids to the liquids (e.g., heaters, piezoelectric elements, or the like). The printing element board 303 is attached to a printing-element placement portion formed at a member forming the channel formation part 306. Specifically, the printing element board 303 is disposed on the bottom surface of the whole cartridge 100 and, when ejecting the liquids, ejects the liquids from a close distance to the print medium 103.

The lid 201 is disposed so as to close the opening of the case 200, and defines the accommodation chambers 302 for accommodating the absorbers 300. The lid 201 includes an atmosphere communication port not illustrated, through which external air can be taken in in the amount of the liquids inside the absorbers 300 consumed by ejection.

Figure 4:
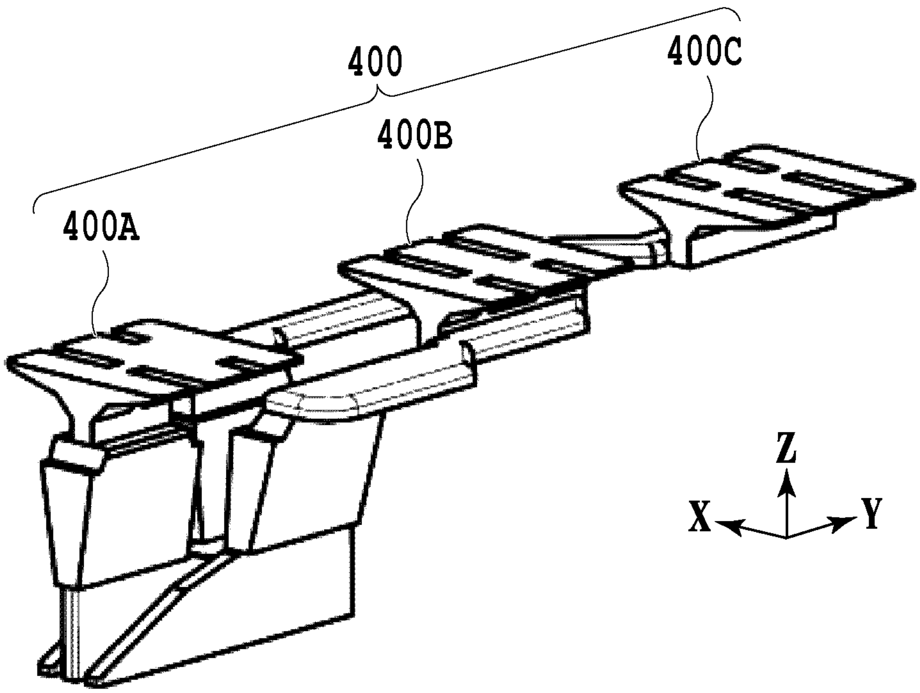
FIG. 4 is a perspective view illustrating one example of channels in the one embodiment.
Figure 5A:
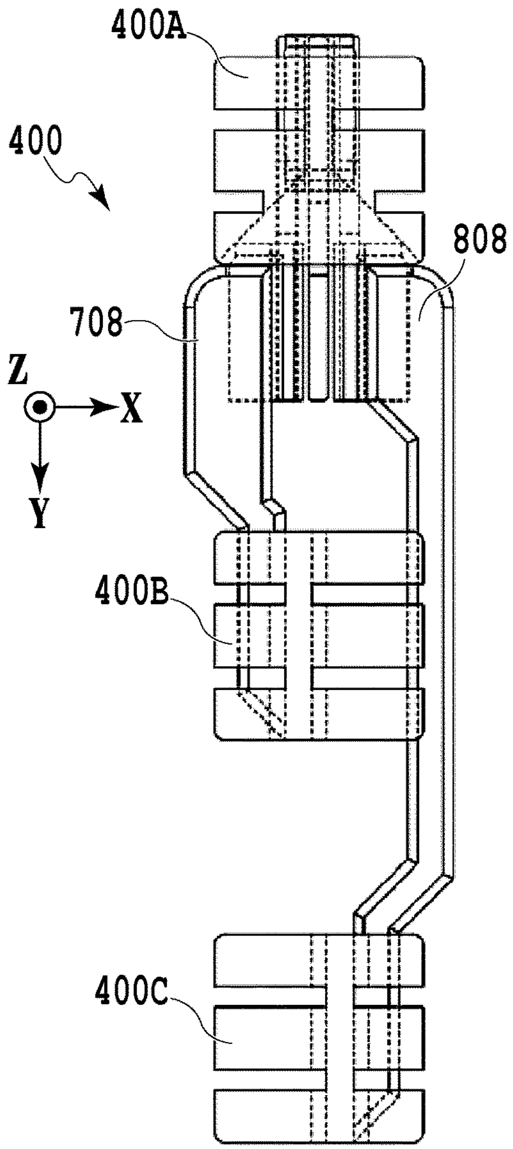
FIG. 5A is top view of a channel part.
Figure 5B:
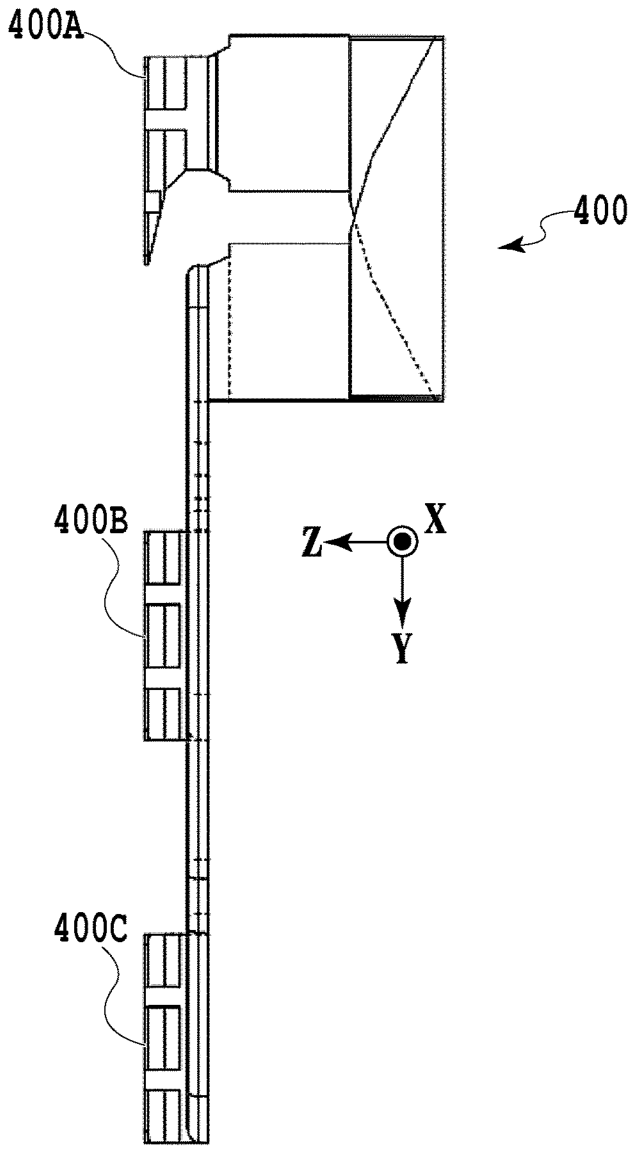
FIG. 5B is a side view of the channel part.
Figure 5C:
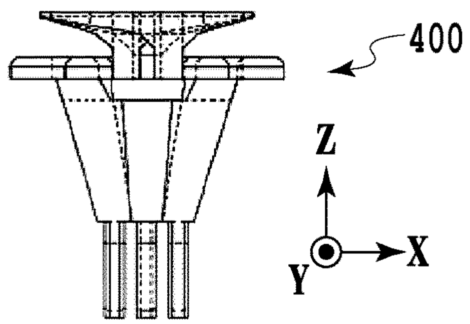
FIG. 5C is a front view of the channel part.

FIG. 4 is a perspective view of spaces as channels for the liquids inside the case extracted, modeled, and illustrated as a channel part 400. FIG. 5A is a top view of the channel part 400, FIG. 5B is a side view of the channel part 400, and FIG. 5C is a front view of the channel part 400. Horizontal portions 708 and 808 illustrated in FIG. 5A will be described later. The channel part 400 is a model obtained by extracting channels of the inks, and includes channels for the three colors (400A, 400B, and 400C). These channels are independent of one another. Specifically, as illustrated in FIG. 5A, the channels 400A, 400B, and 400C are disposed in this order along the Y direction. Thus, the channel part 400 is configured to be capable of supplying the liquids in the accommodation chambers 302 (see FIG. 3) to the printing element board 303 (see FIG. 3).

Figure 6A:
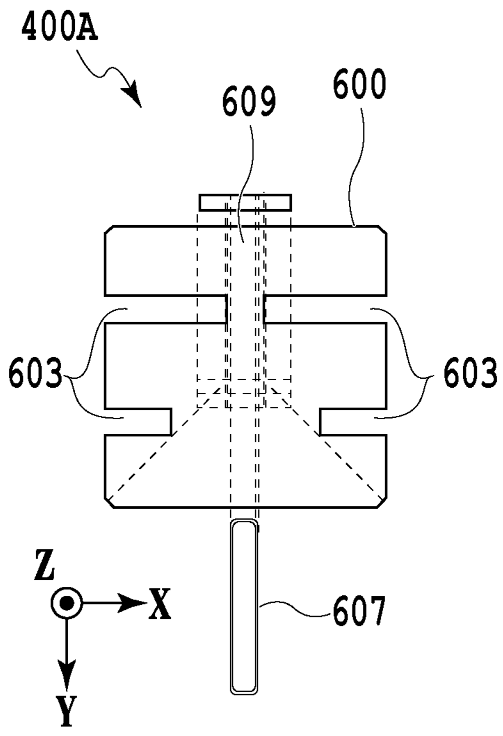
FIG. 6A is top view of a channel.
Figure 6B:
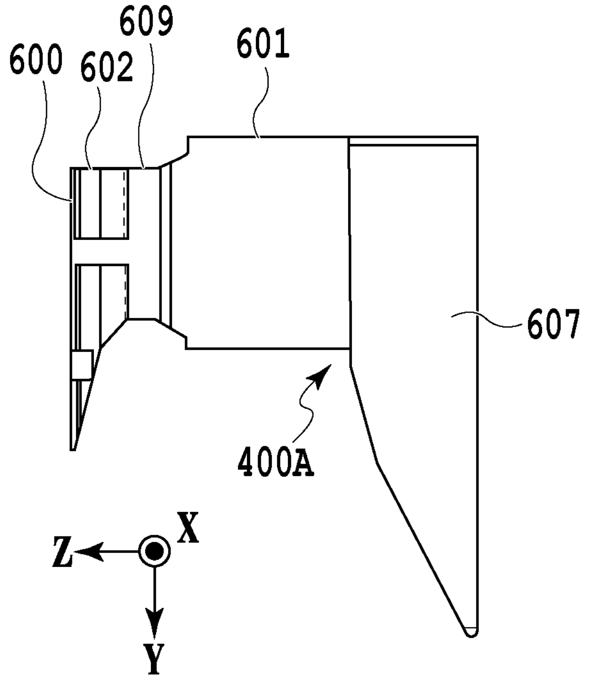
FIG. 6B is a side view of the channel.
Figure 6C:
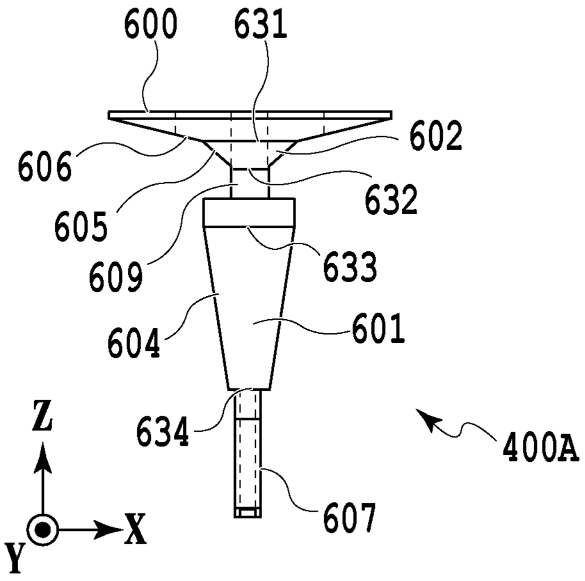
FIG. 6C is a front view of the channel.
Figure 7A:
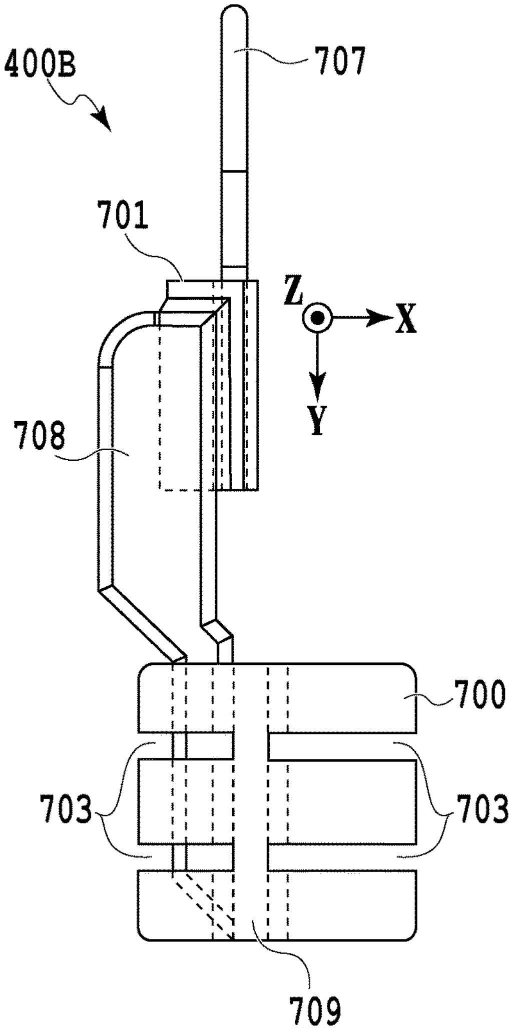
FIG. 7A is top view of a channel.
Figure 7B:
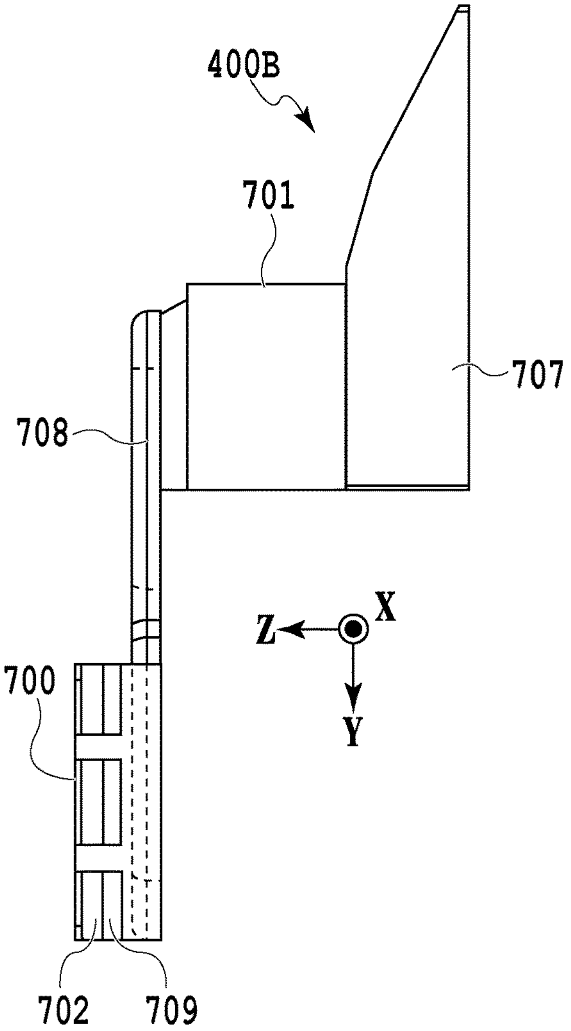
FIG. 7B is a side view of the channel.
Figure 7C:
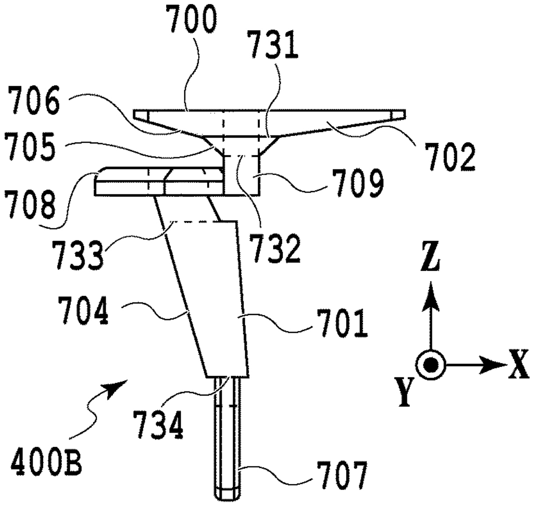
FIG. 7C is a front view of the channel.
Figure 8A:
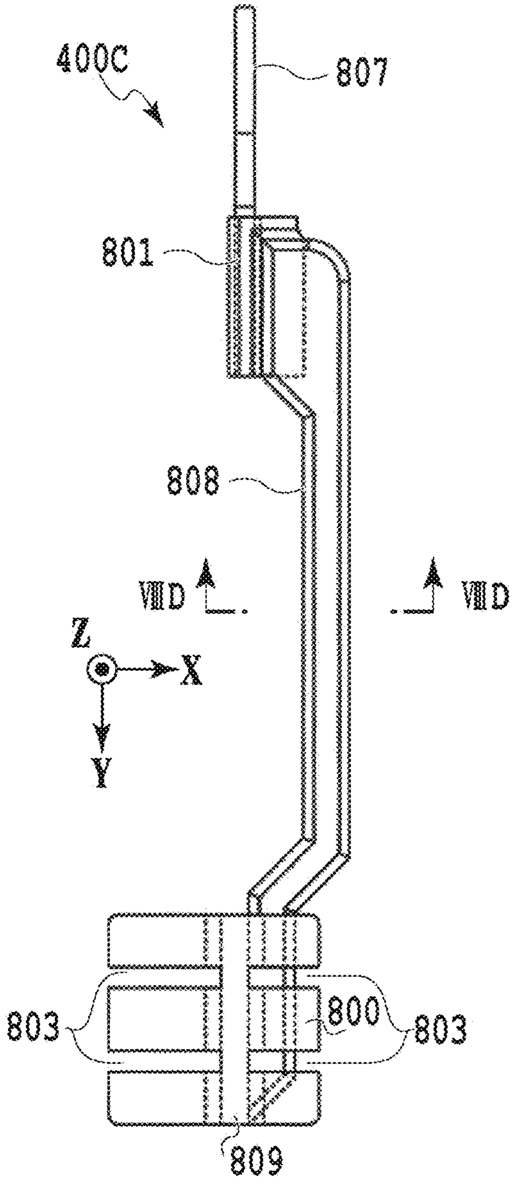
FIG. 8A is top view of a channel.
Figure 8B:
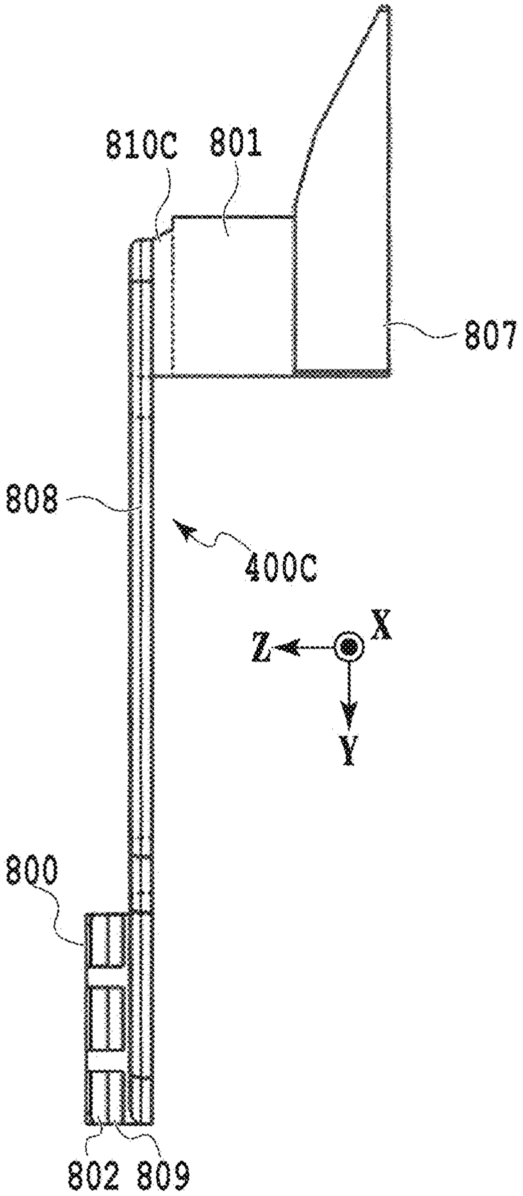
FIG. 8B is a side view of the channel.
Figure 8C:
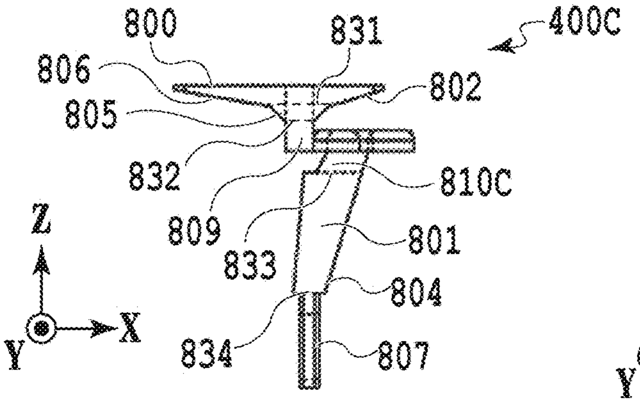
FIG. 8C is a front view of the channel.
Figure 8D:
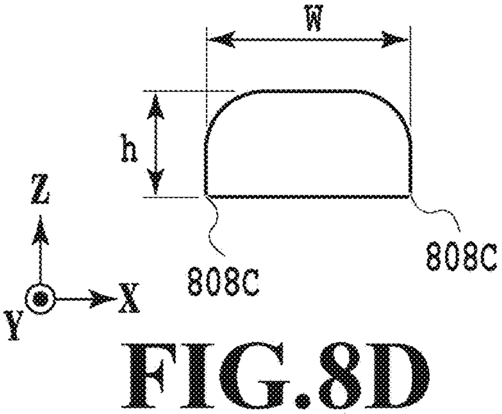
FIG. 8D is a cross-sectional view along the VIIID-VIIID line in FIG. 8A.

FIG. 6A is a top view of the channel 400A, FIG. 6B is a side view of the channel 400A, and FIG. 6C is a front view of the channel 400A. FIG. 7A is a top view of the channel 400B, FIG. 7B is a side view of the channel 400B, and FIG. 7C is a front view of the channel 400B. FIG. 8A is a top view of the channel 400C, FIG. 8B is a side view of the channel 400C, FIG. 8C is a front view of the channel 400C, and FIG. 8D is a cross-sectional view along the VIIID-VIIID line in FIG. 8A.

As illustrated in FIGS. 6A to 6C, the channel 400A includes a first opening portion 600 covered with a filter 301A (see FIG. 3) and a first reservoir portion 601. The channel 400A includes a second reservoir portion 602, a second opening portion 609 connecting the first and second reservoir portions 601 and 602, and a connection channel 607 to be connected to the printing element board 303 (see FIG. 3).

In the present embodiment, a space that is capable of storing bubbles and has a larger width than the width of a connection portion (e.g., the connection channel 607, 707, or 807) in a view of the cartridge along the extending direction in which the horizontal portions (described later) extend will be referred to as "reservoir portion". For example, the first and second reservoir portions 601 and 602 are wider than other regions and capable of storing bubbles generated in ejection, and the like, above the liquid surface.

The first reservoir portion 601 has a tapered portion 604 with an opening 633 at the upper end in the vertical direction and an opening 634 at the lower end in the state where the cartridge is mounted to the printing apparatus, the opening 633 being larger than the opening 634. In the state where the cartridge is mounted to the printing apparatus, the second reservoir portion 602 is disposed so as to extend along the vertical direction.

The second reservoir portion 602 has a tapered portion (a first tapered portion 605 and a second tapered portion 606) with the first opening portion 600 at the upper end in the vertical direction and the second opening portion 609 at the lower end in the state where the cartridge is mounted to the printing apparatus, the first opening portion 600 being larger than the second opening portion 609. The first reservoir portion 601 is disposed between the connection channel 607 and the second reservoir portion 602. The second reservoir portion 602 is disposed between the first reservoir portion 601 and the first accommodation chamber 302A (see FIG. 3).

The first opening portion 600 is an opening that receives the liquid which has passed through the filter 301A, and is located at the bottom of the accommodation chamber 302 (see FIG. 3) accommodating the absorber 300A. The first and second reservoir portions 601 and 602 are formed to be spaces which become wider the farther they get upward in the vertical direction. Specifically, to be a space that becomes wider the farther it gets upward in the vertical direction, the first reservoir portion 601 is provided with the tapered portion 604, and the second reservoir portion 602 is provided with the first and second tapered portions 605 and 606. Such a configuration can collect bubbles generated inside the channel by utilizing buoyancy and keep the bubbles from approaching the ejection ports.

In the present embodiment, multiple partitions 603 are provided in the second reservoir portion 602. Each of the multiple partitions 603 partitions the inside of the second reservoir portion 602 into multiple spaces connected to each other. Each two adjacent partitions 603 are desirably spaced from each other by 1 mm or more. Also, the inside of the second reservoir portion 602 is desirably partitioned into two or more spaces. It is preferable to form many spaces inside the second reservoir portion 602.

By partitioning the inside of the second reservoir portion 602 into multiple spaces, bubbles will be kept from moving into another section. By partitioning the inside of the second reservoir portion 602 into multiple spaces, even in a case when one space is closed due to some reason, the other spaces will maintain the channel. These will prevent a liquid supply failure in a case of supplying the liquid to the downstream side (the lower side in the vertical direction).

At the second reservoir portion 602, two tapers, namely the first and second tapered portions 605 and 606, are formed in order to move bubbles through the narrow spaces toward the filter. To let bubbles move upward while preventing formation of a meniscus, the angle of the first tapered portion 605 with respect to the horizontal direction (X direction) is preferably ten degrees or more and eighty degrees or less, more preferably twenty degrees or more and sixty degrees or less, and further preferably thirty degrees or more and fifty degrees or less. At the second reservoir portion 602, the distance from each space in the second reservoir portion 602 to the filter 301A needs to be short to increase the flow velocity of the ink that is caused to flow in a recovery operation, such as suction. To that end, the angle of the second tapered portion 606 with respect to the horizontal direction is preferably forty-five degrees or less, more preferably thirty degrees or less, and further preferably twenty degrees or less.

The first reservoir portion 601 is connected to the connection channel 607, and the connection channel 607 is connected to an ejection port array in the printing element board 303 (see FIG. 3).

In the present embodiment, the second reservoir portion 602 includes an opening 631 located at an upper end portion of the first tapered portion 605 and an opening 632 located at a lower end portion of the first tapered portion 605. The area of the opening 631 is larger than the area of the opening 632. For example, the area of the opening 631 is preferably at least 1.5 times larger than the area of the opening 632. This is to store generated bubbles and keep the bubbles from flowing into the ejection port array.

The first reservoir portion 601 includes the opening 633 located at an upper end portion of the first reservoir portion 601 and the opening 634 located at a lower end portion of the first reservoir portion 601. The area of the opening 633 is larger than the area of the opening 634. For example, the area of the opening 633 is preferably at least 1.2 times larger than the area of the opening 634. This is to store generated bubbles and keep the bubbles from flowing into the ejection port array.

As illustrated in FIGS. 7A to 7C, the channel 400B includes a first opening portion 700 covered with a filter 301B, a first reservoir portion 701, a second reservoir portion 702, a second opening portion 709 connecting the first and second reservoir portions 701 and 702, and a connection channel 707. The first reservoir portion 701, which has a tapered portion 704, is disposed lower than the horizontal portion 708.

In the channel 400B, the first and second reservoir portions 701 and 702 are wider than other regions and capable of storing bubbles generated in ejection and the like above the liquid surface.

The first reservoir portion 701 has a tapered portion 704 with an opening 733 at the upper end in the vertical direction and an opening 734 at the lower end in the state where the cartridge is mounted to the printing apparatus, the opening 733 being larger than the opening 734. In the state where the cartridge is mounted to the printing apparatus, the second reservoir portion 702 is disposed so as to extend along the vertical direction. The first reservoir portion 701 is disposed between the connection channel 707 and the horizontal portion 708. The second reservoir portion 702 is disposed between the horizontal portion 708 and the first accommodation chamber 302A (see FIG. 3).

In the state where the cartridge is mounted to the printing apparatus, the second reservoir portion 702 is disposed so as to extend along the vertical direction. The second reservoir portion 702 has a tapered portion (a first tapered portion 705 and a second tapered portion 706) with the first opening portion 700 at the upper end in the vertical direction and the second opening portion 709 at the lower end in the state where the cartridge is mounted to the printing apparatus, the first opening portion 700 being larger than the second opening portion 709.

Multiple partitions 703 are provided in the second reservoir portion 702. Each of the multiple partitions 703 partitions the inside of the second reservoir portion 702 into multiple spaces connected to each other. Each two adjacent partitions 703 is desirably spaced from each other by 1 mm or more. Also, the inside of the second reservoir portion 702 is desirably partitioned into two or more spaces. It is preferable to form many spaces inside the second reservoir portion 702.

By partitioning the inside of the second reservoir portion 702 into multiple spaces, bubbles will be kept from moving into another section. By partitioning the inside of the second reservoir portion 702 into multiple spaces, even in a case when one space is closed due to some reason, the other spaces will maintain the channel. These will prevent a liquid supply failure in a case of supplying the liquid to the downstream side (the lower side in the vertical direction).

The first opening portion 700 is an opening that receives the liquid that has passed through the filter 301B (see FIG. 3), and is located at the bottom of the accommodation chamber 302 (see FIG. 3) accommodating the absorber 300B (see FIG. 3). The first reservoir portion 701 provided near the nozzle array and the second reservoir portion 702 provided near the accommodation chamber are connected through the second opening portion 709 and the horizontal portion 708 extending in the Y direction. Also, the first and second reservoir portions 701 and 702 are formed to be spaces that become wider the farther they get upward in the vertical direction. Specifically, to be a space that becomes wider the farther it gets upward in the vertical direction, the first reservoir portion 701 is provided with the tapered portion 704, and the second reservoir portion 702 is provided with the first and second tapered portions 705 and 706. Such a configuration can collect bubbles generated inside the channel by utilizing buoyancy and keep the bubbles from approaching the ejection ports.

At the second reservoir portion 702, two tapers, namely, the first and second tapered portions 705 and 706, are formed in order to move bubbles through the narrow spaces toward the filter. To let bubbles move upward while preventing formation of a meniscus, the angle of the first tapered portion 705 with respect to the horizontal direction (X direction) is preferably ten degrees or more and eighty degrees or less, more preferably twenty degrees or more and sixty degrees or less, and further preferably thirty degrees or more and fifty degrees or less. At the second reservoir portion 702, the distance from each space in the second reservoir portion 702 to the filter 301B needs to be short to increase the flow velocity of the ink that is caused to flow in a recovery operation, such as suction. To that end, the angle of the second tapered portion 706 with respect to the horizontal direction is preferably forty-five degrees or less, more preferably thirty degrees or less, and further preferably twenty degrees or less.

The first reservoir portion 701 is connected to the connection channel 707, and the connection channel 707 is connected to an ejection port array in the printing element board 303.

In the present embodiment, the second reservoir portion 702 includes an opening 731 located at an upper end portion of the first tapered portion 705 and an opening 732 located at a lower end portion of the first tapered portion 705. The area of the opening 731 is larger than the area of the opening 732. For example, the area of the opening 731 is preferably at least 1.5 times larger than the area of the opening 732. This is to store generated bubbles and keep the bubbles from flowing into the ejection port array.

The first reservoir portion 701 includes the opening 733 located at an upper end portion of the first reservoir portion 701 and the opening 734 located at a lower end portion of the first reservoir portion 701. The area of the opening 733 is larger than the area of the opening 734. For example, the area of the opening 733 is preferably at least 1.2 times larger than the area of the opening 734. This is to store generated bubbles and keep the bubbles from flowing into the ejection port array.

As illustrated in FIGS. 8A to 8D, the channel 400C includes a first opening portion 800 covered with a filter 301C (see FIG. 3), a first reservoir portion 801, a second reservoir portion 802, a second opening portion 809 connecting the first and second reservoir portions 801 and 802, and a connection channel 807.

In the channel 400C, the first and second reservoir portions 801 and 802 are wider than other regions and capable of storing bubbles generated in ejection and the like above the liquid surface.

The first reservoir portion 801 has a tapered portion 804 with an opening 833 at the upper end in the vertical direction and an opening 834 at the lower end in the state where the cartridge is mounted to the printing apparatus, the opening 833 being larger than the opening 834. In the state where the cartridge is mounted to the printing apparatus, the second reservoir portion 802 is disposed so as to extend along the vertical direction.

The first reservoir portion 801 is disposed between the connection channel 807 and the horizontal portion 808. The second reservoir portion 802 is disposed between the horizontal portion 808 and the third accommodation chamber 302C (see FIG. 3). In the state where the cartridge is mounted to the printing apparatus, the second reservoir portion 802 is disposed so as to extend along the vertical direction. The second reservoir portion 802 has a tapered portion (a first tapered portion 805 and a second tapered portion 806) with the first opening portion 800 at the upper end in the vertical direction and the second opening portion 809 at the lower end in the state where the cartridge is mounted to the printing apparatus, the first opening portion 800 being larger than the second opening portion 809.

Multiple partitions 803 are provided in the second reservoir portion 802. Each of the multiple partitions 803 partitions the inside of the second reservoir portion 802 into multiple spaces connected to each other. Each two adjacent partitions 803 are desirably spaced from each other by 1 mm or more. Also, the inside of the second reservoir portion 802 is desirably partitioned into two or more spaces. It is preferable to form many spaces inside the second reservoir portion 802.

By partitioning the inside of the second reservoir portion 802 into multiple spaces, bubbles will be kept from moving into another section. By partitioning the inside of the second reservoir portion 802 into multiple spaces, even in a case when one space is closed due to some reason, the other spaces will maintain the channel. These will prevent a liquid supply failure in a case of supplying the liquid to the downstream side (the lower side in the vertical direction).

The first opening portion 800 is an opening that receives the liquid that has passed through the filter 301C, and is located at the bottom of the accommodation chamber 302 accommodating the absorber 300C. The first reservoir portion 801 provided near the nozzle array and the second reservoir portion 802 provided near the accommodation chamber are connected through the second opening portion 809 and the horizontal portion 808 extending in the Y direction. Also, the first and second reservoir portions 801 and 802 are formed to be spaces which become wider the farther they get upward in the vertical direction. To be a space that becomes wider the farther it gets upward in the vertical direction, the first reservoir portion 801 is provided with the tapered portion 804, and the second reservoir portion 802 is provided with the first and second tapered portions 805 and 806. Such a configuration can collect bubbles generated inside the channel by utilizing buoyancy and keep the bubbles from approaching the ejection ports.

At the second reservoir portion 802, two tapers, namely the first and second-tapered portions 805 and 806, are formed in order to move bubbles through the narrow spaces toward the filter. To let bubbles move upward while preventing formation of a meniscus, the angle of the first tapered portion 805 with respect to the horizontal direction is preferably ten degrees or more and eighty degrees or less, more preferably twenty degrees or more and sixty degrees or less, and further preferably thirty degrees or more and fifty degrees or less. At the second reservoir portion 802, the distance from each space in the second reservoir portion 802 to the filter 301C needs to be short to increase the flow velocity of the ink that is caused to flow in a recovery operation, such as suction. To that end, the angle of the second tapered portion 806 with respect to the horizontal direction is desirably forty-five degrees or less, more desirably thirty degrees or less, and further desirably twenty degrees or less.

In the present embodiment, the horizontal portion 808 is provided lower than the second opening portion 809. The first reservoir portion 801, which has the tapered portion 804, is disposed lower than the horizontal portion 808. The horizontal portion 808 extends in the longitudinal direction (the Y direction) of the cartridge. A tip of the horizontal portion 808 is connected to a third opening portion 810C. The third opening portion 810C is connected to an ejection port array in the printing element board through the first reservoir portion 801 and the connection channel 807. The configuration provided with such a horizontal portion 808 improves the degree of freedom in the layout in the accommodation chamber 302.

In the present embodiment, the second reservoir portion 802 includes an opening 831 located at an upper end portion of the first tapered portion 805 and an opening 832 located at a lower end portion of the first tapered portion 805. The area of the opening 831 is larger than the area of the opening 832. For example, the area of the opening 831 is preferably at least 1.5 times larger than the area of the opening 832. This is to store generated bubbles and keep the bubbles from flowing into the ejection port array.

The first reservoir portion 801 includes the opening 833 located at an upper end portion of the first reservoir portion 801 and the opening 834 located at a lower end portion of the first reservoir portion 801. The area of the opening 833 is larger than the area of the opening 834. For example, the area of the opening 833 is preferably at least 1.2 times larger than the area of the opening 834. This is to store generated bubbles and keep the bubbles from flowing into the ejection port array.

The first reservoir portion 801 is connected to the connection channel 807, and the connection channel 807 is connected to an ejection port array in the printing element board 303.

FIG. 8D is a cross-sectional view of the horizontal portion 808. As illustrated in FIG. 8D, a cross-sectional shape of the horizontal portion 808 has angular portions 808C at a part thereof. Specifically, the angular portions 808C are provided at the bottom of the horizontal portion 808. In a case when bubbles are generated, the angular portions 808C will trap the bubbles with capillary forces at the angular portions 808C and allow the liquid to be supplied to the third opening portion 810C.

Bubbles naturally tends to accumulate on the upper side of the channel. For this reason, the angular portions 808C is desirably present on the lower side in the vertical direction. Also, the number of angular portions 808C may be at least one as long as bubbles can be trapped.

Nonetheless, it is desirable to form many angular portions 808C. A width w of the horizontal portion 808 is larger than a height h of the horizontal portion 808. This reduces the height of the cartridge as a whole and also ensures the flowability of the liquid in a case where bubbles are generated. That is, making the width w of the horizontal portion 808 larger than its height h ensures the ease of supply of the liquid through the horizontal portion 808. For example, the ratio of the height h of the horizontal portion 808 to the width w of the horizontal portion 808 is desirably 1:1.5 or more.

Note that angular portions may be provided at the bottom of the above-described horizontal portion 708 (see FIGS. 7A to 7C). In this case too, the angular portions of the horizontal portion 708 can trap bubbles and allow the liquid to be supplied to the downstream side.

Figure 9B:
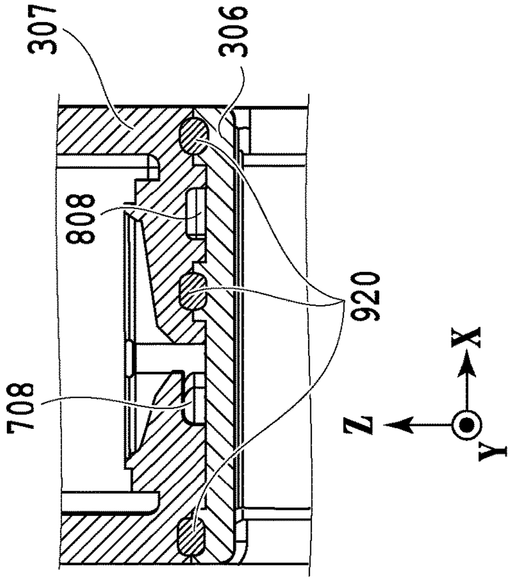
FIG. 9B is a cross-sectional view along the IXB-IXB line in FIG. 9A.
Figure 9A:
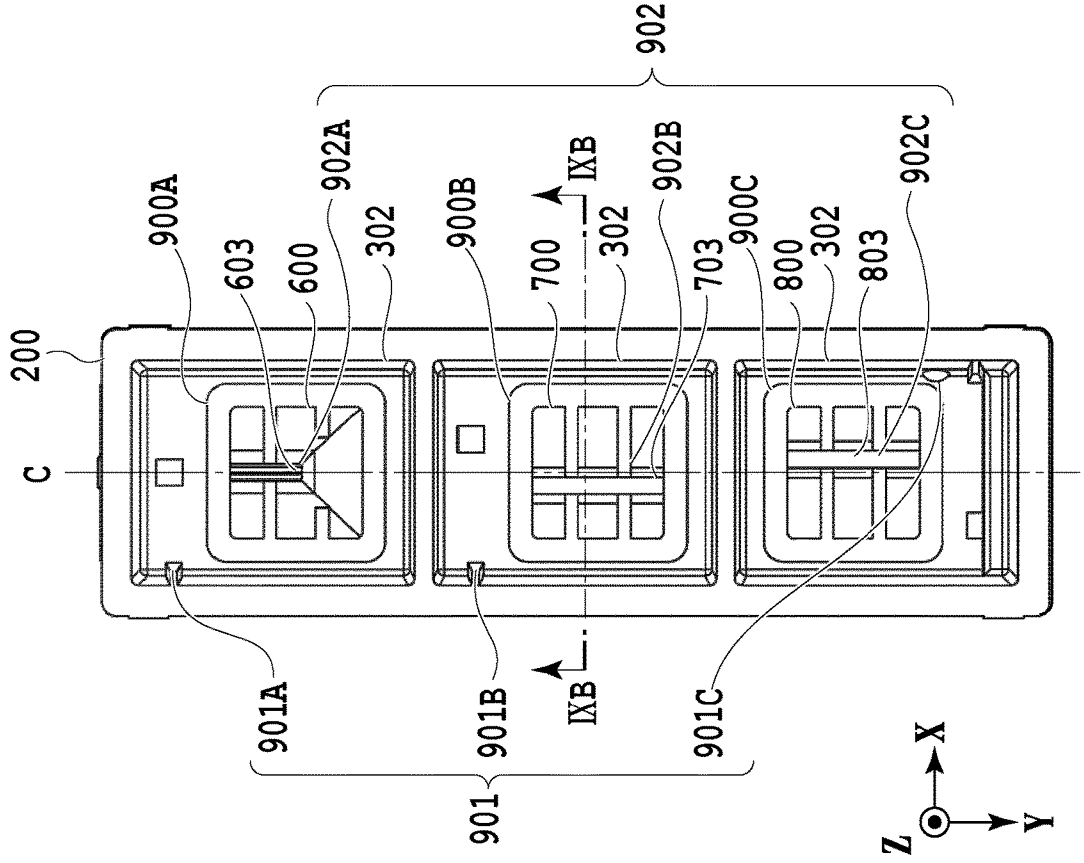
FIG. 9A is a top view illustrating a case without absorbers and filters accommodated therein.

FIG. 9A is a top view illustrating the case 200 without the absorbers and the filters accommodated therein. In the case 200, openings 900A, 900B, and 900C are provided on the same line extending along the Y direction. The opening 900A is connected to the first opening portion 600 (FIGS. 6A to 6C). The opening 900B is connected to the first opening portion 700 (FIGS. 7A to 7C). The opening 900C is connected to the first opening portion 800 (FIGS. 8A to 8C). The openings 900A, 900B, and 900C are each provided on the upstream side in the Y direction so as to shorten the lengths of the channels 400A (see FIG. 4), 400B (see FIG. 4), and 400C (see FIG. 4) in the Y direction. In addition, a rib 901 is provided in each accommodation chamber 302 to allow communication with the atmosphere even with the absorber inserted. A rib 901A is provided in the accommodation chamber 302 with the opening 900A. A rib 901B is provided in the accommodation chamber 302 with the opening 900B. A rib 901C is provided in the accommodation chamber 302 with the opening 900C.

In the accommodation chambers 302, the ribs 901 are disposed at positions close to the openings 900A, 900B, and 900C, respectively. This will prevent leakage of the liquids from the lid 201 even in a case when air inside the channel part 400 and air in the gaps between the absorbers 300 and the accommodation chambers 302 expand due to environmental changes (changes in temperature and/or atmospheric pressure).

As illustrated in FIG. 9A, the second opening portion 609 of the channel 400A is provided on a center line C of the case 200 in the X direction. The second opening portion 709 of the channel 400B is shifted from the center line C in the −X direction (the leftward direction in FIG. 9A), and the rib 901B is disposed on the side closer to the second opening portion 709 (the left side in FIG. 9A). The second opening portion 809 of the channel 400C is shifted from the center line C in the +X direction (the rightward direction in FIG. 9A), and the rib 901C is disposed on the side closer to the second opening portion 809 (the right side in FIG. 9A).

The amount of shift of each of the second opening portions 709 and 809 from the center line C is desirably in the range of 5% to 30%, more desirably in the range of 10% to 25%, and further desirably in the range of 15% to 20% of the width of the filter in the X direction. In the present embodiment, in which the filter width is 12 mm, the second opening portions 709 and 809 are shifted by +1 mm (8.3%) in the X direction, respectively. Shifting the second opening portions 709 and 809 by excessively large shift amounts is not desirable since it leads to a situation where the liquids cannot be easily supplied from the sides opposite from the sides toward which the second opening portions 709 and 809 are shifted. It is therefore desirable to provide the second opening portions 709 and 809 at positions close to the center line C, as in the present embodiment. In the present embodiment, the shapes of the second opening portions 609, 709, and 809 are longitudinally elongated slit shapes, but may be other shapes. For example, the shapes of the second opening portions 609, 709, and 809 may be circular, elliptical, or the like.

In the present embodiment, the shape of the second opening portion 609 is a slit shape with two parallel long sides extending along the longitudinal direction of the cartridge (Y direction). The second opening portion 609 has angular portions 902A at the four corners of the opening. That is, a cross-sectional shape of the second opening portion 609 includes the angular portions 902A at least at a part thereof. Forming the second opening portion 609 in a slit shape as described above ensures a certain cross-sectional area for the channel while also preventing entry of relatively large bubbles into the channel. That is, forming the second opening portion 609 into a slit shape enables more stable supply of the liquid to the ejection ports.

In the present embodiment, the shape of the second opening portion 709 is a slit shape with two parallel long sides extending along the longitudinal direction of the cartridge (Y direction). The second opening portion 709 has angular portions 902B at the four corners of the opening. That is, a cross-sectional shape of the second opening portion 709 includes the angular portions 902B at least at a part thereof. Forming the second opening portion 709 in a slit shape as described above ensures a certain cross-sectional area for the channel while also preventing entry of relatively large bubbles into the channel. That is, forming the second opening portion 709 into a slit shape enables more stable supply of the liquid to the ejection ports.

In the present embodiment, the shape of the second opening portion 809 is a slit shape with two parallel long sides extending along the longitudinal direction of the cartridge (Y direction). The second opening portion 809 has angular portions 902C at the four corners of the opening. That is, a cross-sectional shape of the second opening portion 809 includes the angular portions 902C at least at a part thereof. Forming the second opening portion 809 in a slit shape as described above ensures a certain cross-sectional area for the channel while also preventing entry of relatively large bubbles into the channel. That is, forming the second opening portion 809 into a slit shape enables more stable supply of the liquid to the ejection ports.

FIG. 9B is a cross-sectional view along the line IXB-IXB in FIG. 9A. The horizontal portions 708 and 808 are formed by joining a first member forming the channel formation part 306 and a second member forming the box part 307 with recesses formed in the first member and recesses formed in the second member aligned with each other. Specifically, resin 920 is poured into spaces between the channel formation part 306 and the box part 307 formed by recesses other than those which form the horizontal portions 708 and 808. As a result, the horizontal portions 708 and 808 are sealed and the channel formation part 306 and the box part 307 are fixed to each other.

By such a joining method, the channel including the horizontal portion 708 is formed in the first member forming the channel formation part 306 and the second member forming the box part 307. The channel including the horizontal portion 808 is formed in the first member forming the channel formation part 306 and the second member forming the box part 307. The horizontal portions 708 and 808 include portions of the first member forming the channel formation part 306 and the second member forming the box part 307 at which they are joined. By joining the channel formation part 306 and the box part 307 as above, the channels are formed without making welding burrs on the inner wall of the horizontal portion 708 or leaving an adhesive agent sticking out of the inner wall.

Figure 10:
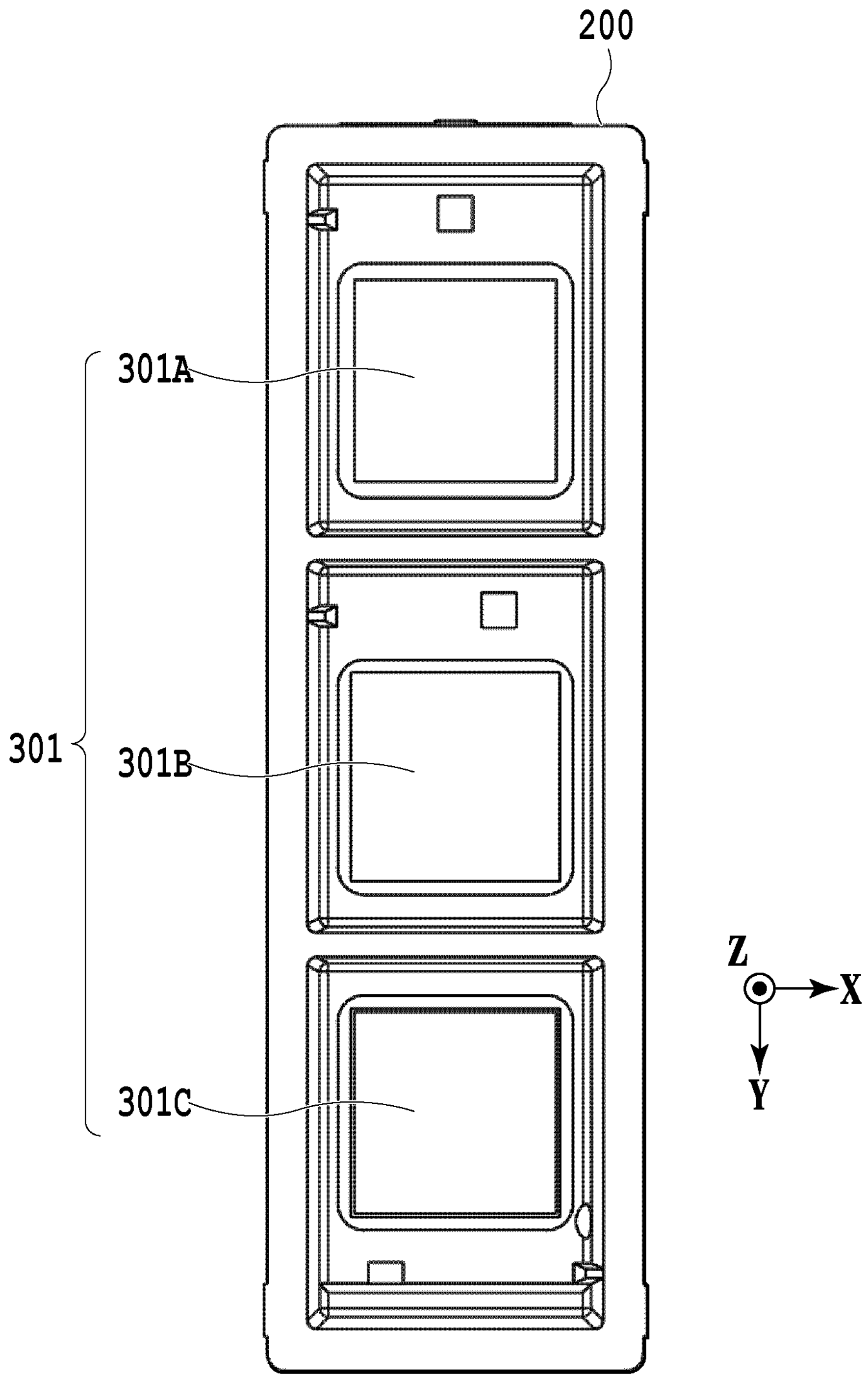
FIG. 10 is a plan view illustrating one example of the case in the one embodiment.

FIG. 10 is a top view illustrating the case 200 with the filter 301 welded thereto.

The filter 301A is welded to the case 200 so as to cover the second opening portion 609 in order to prevent entry of dust into the second opening portion 609 (see FIGS. 6B and 6C). The filter 301B is welded to the case 200 so as to cover the second opening portion 709 in order to prevent entry of dust into the second opening portion 709 (see FIGS. 7B and 7C). The filter 301C is welded to the case 200 so as to cover the second opening portion 809 in order to prevent entry of dust into the second opening portion 809 (see FIGS. 8B and 8C). Note that the filters 301 and the case 200 may be fixed by bonding, or the like, instead of welding. Further, the case 200 and the filters 301 may be formed integrally with each other.

Figure 11:
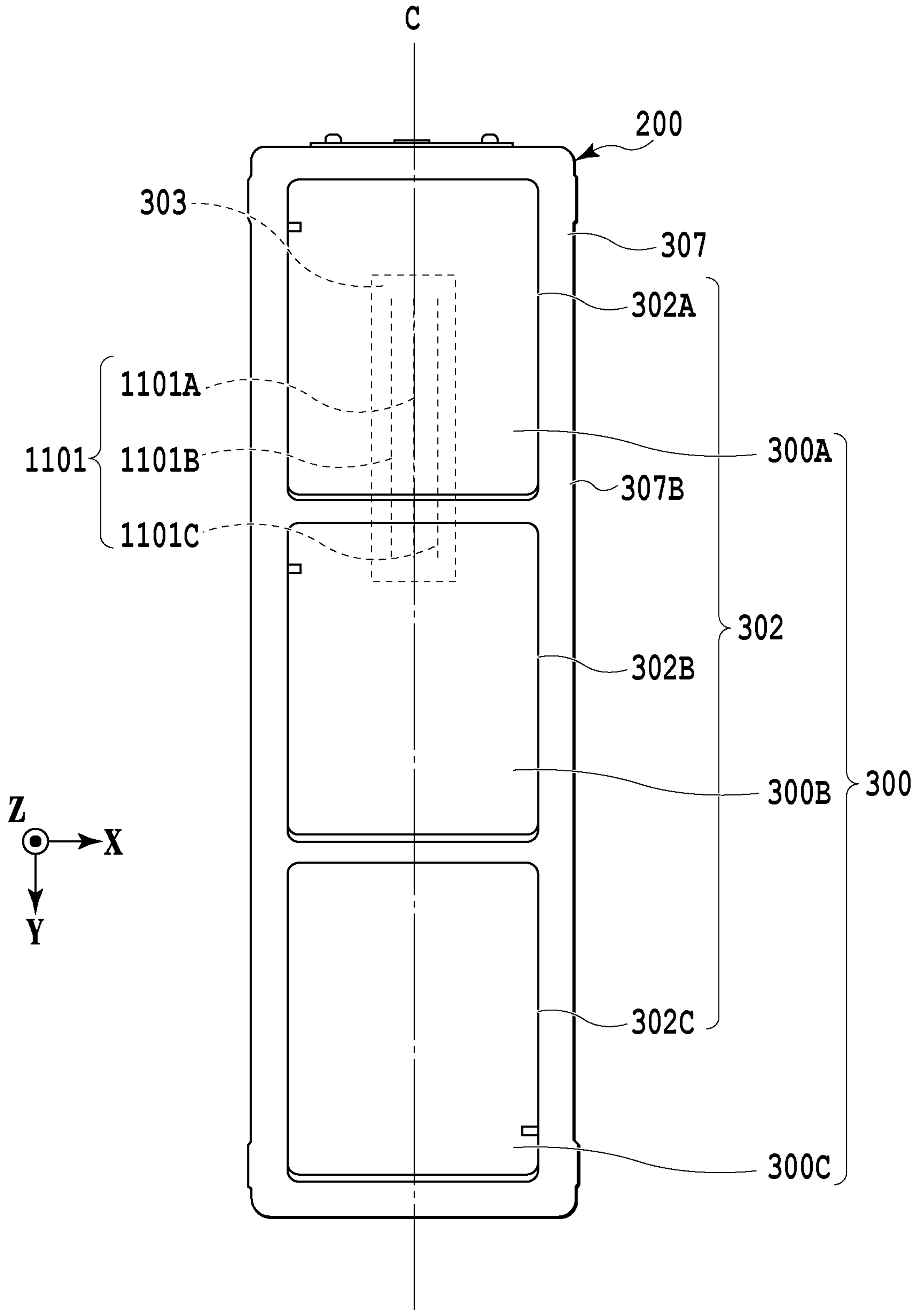
FIG. 11 is a plan view illustrating one example of accommodation chambers in the one embodiment.

FIG. 11 is a top view illustrating the case 200 with the absorbers 300 inserted therein. The absorbers 300 are inserted in the accommodation chambers 302 in the case 200, and the liquids can be held in the absorbers 300. The liquids held in the absorbers 300 are supplied to the printing element board 303 through the channel part 400 (see FIG. 4). In FIG. 11, the printing element board 303 and ejection port arrays 1101 are illustrated with dashed lines.

The first opening portion 600 (see FIGS. 6A to 6C) located at the bottom of the first accommodation chamber 302A (see FIG. 3) is disposed directly above the printing element board 303. The first opening portion 700 (see FIGS. 7A to 7C) located at the bottom of the second accommodation chamber 302B (see FIG. 3) is not disposed directly above the printing element board 303. The first opening portion 800 (see FIGS. 8A to 8C) located at the bottom of the third accommodation chamber 302C (see FIG. 3) is not disposed directly above the printing element board 303.

The liquid held in the absorber 300A is supplied to an ejection port array 1101A in the printing element board 303 through the channel 400A (see FIG. 4). The liquid held in the absorber 300B is supplied to an ejection port array 1101B in the printing element board 303 through the channel 400B (see FIG. 4). The liquid held in the absorber 300C is supplied to an ejection port array 1101C in the printing element board 303 through the channel 400C (see FIG. 4).

In the cartridge 100 in the present embodiment, the inside of the case 200 is partitioned to form the three accommodation chambers 302 such that the absorbers 300A, 300B, and 300C can be disposed in the Y direction along the center line C in the X direction. The cartridge 100 is moved in the +X direction or the −X direction when mounted on and scanned with the carriage 101. The printing element board 303 includes the ejection port arrays 1101 formed by arraying ejection ports along the Y direction. In sum, the absorbers 300A, 300B, and 300C are disposed along a direction which is the same as the array direction of the ejection ports and crosses (in the present embodiment, perpendicularly crosses) the scanning direction.

The case 200 is formed by molding resin. In the formation of the case 200, the channel formation part 306 (see FIG. 3) and the box part 307 are separately molded (primary molding), and then the channel formation part 306 and the box part 307 are joined (secondary molding). Note that the secondary molding may use a method that involves making spaces between the abutting portions of the box part 307 and the channel formation part 306 and pouring resin into these spaces, or use other connecting methods such as bonding. By separately molding the channel formation part 306 and the box part 307 and then joining the channel formation part 306 and the box part 307 as described above, channels can be formed in the case 200. Incidentally, in the present embodiment, the accommodation chambers 302 are arrayed at equal intervals, but the intervals do not need to be equal.

The width of the cartridge 100 (see FIG. 1) in the X direction is desirably 25 mm or less. In the present embodiment, the three accommodation chambers 302 are disposed linearly in the Y direction. This makes the width of the cartridge 100 smaller than those of conventional cartridges. Here, the width of each absorber 300 is desirably 5 mm or more from the viewpoint of the ease of supply of the ink and the ease of introduction of the ink. Likewise, the width of each accommodation chamber 302 in the X direction is desirably 5 mm or more.

Note that the width of the cartridge 100 is desirably 10 mm to 25 mm, more desirably 13 mm to 23 mm, and further desirably 15 mm to 21 mm. As for the ratio of the width of the case 200 in the X direction to its length in the Y direction, the closer the cross section of each absorber 300 in an XY plane to a square, the better the ease of supply of the ink is. Thus, in a case of forming three accommodation chambers as in the present embodiment, the ratio of the width in the X direction to the length in the Y direction is preferably about 2:5 to 2:7. The cartridge 100 in the present embodiment has a width of 20 mm in the X direction and a depth of 70 mm in the Y direction.

As mentioned above, it is desirable that the cross section of each absorber 300 in an XY plane be close to a square. One side is desirably 5 to 25 mm, more desirably 10 to 23 mm, and further desirably 15 to 21 mm. As for the height of each absorber 300 in the Z direction, considering the absorber's ability to hold the liquid, extending the length in the Z direction is preferable in terms of the ease of using up the liquid as compared to extending the length in the X or Y direction. However, extending the dimension in the Z direction will increase the cartridge size and increase the size of the apparatus as a whole accordingly. Thus, the height of each absorber 300 in the Z direction is desirably at most four times, more desirably at most three times, and further desirably at most two times the width in the X direction or the length in the Y direction. Each absorber 300 in the present embodiment has a width of 17 mm in the X direction, a depth of 21 mm in the Y direction, and a height of 33 mm in the Z direction.

Figure 12:
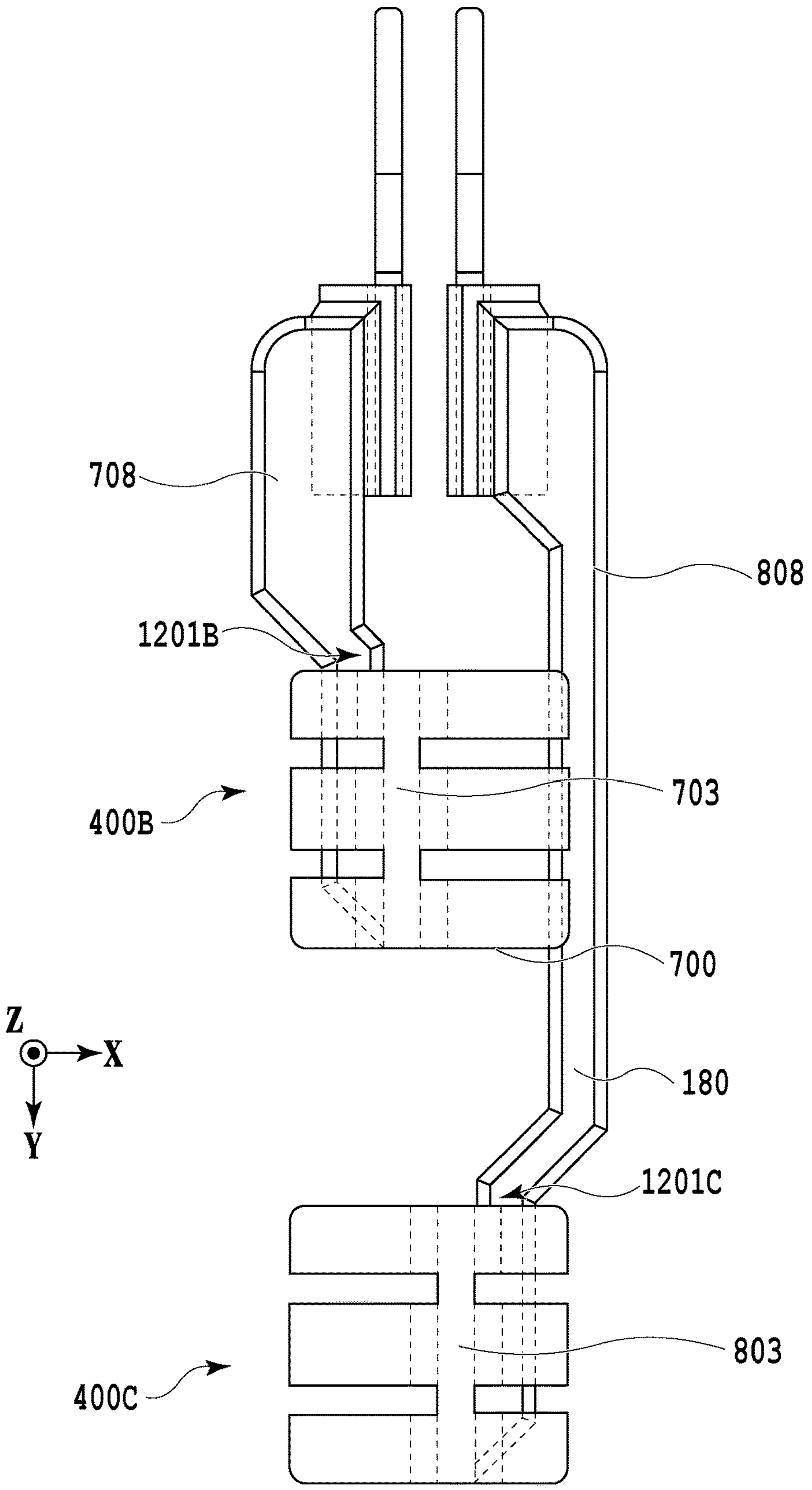
FIG. 12 is a plan view illustrating one example of the channels in the one embodiment.

FIG. 12 is a top view illustrating the channels 400B and 400C, i.e., a view illustrating a state where the channel 400A is excluded from the channel part 400 illustrated in FIG. 5A. The second opening portion 709 of the channel 400B and the second opening portion 809 of the channel 400C are each disposed at a position shifted from the center of the case 200 in the X direction. Specifically, the second opening portion 709 of the channel 400B is disposed to be shifted in the −X direction from the center of the case 200 in the X direction, and the second opening portion 809 of the channel 400C is disposed to be shifted in the +X direction from the center of the case 200 in the X direction. Shifting the second opening portion 709 as above shortens the length of the horizontal portion 708 of the channel 400B extending in the Y direction to the corresponding ejection port array, and also allows the horizontal portion 808 of the channel 400C to have a larger width in the X direction than otherwise. Also, shifting the second opening portion 809 from the center in the opposite direction from the second opening portion 709 shortens the length of the horizontal portion 808 of the channel 400C.

The absorbers 300 are stored in the respective accommodation chambers 302, and the filters 301 are provided between the respective absorbers 300 and the channel part 400 (see FIGS. 10 and 11). The size of each filter 301 is desirably large in order to lower the flow resistance. It is desirable that the size of each filter 301 be at least half of the cross-sectional area of the corresponding absorber 300 in an XY plane, and more desirable that the shape of the filter 301 be close to a square. Such a size and shape increase the contact between the absorber 300 and the filter 301 and improve the case of using up the liquid. Specifically, the size of the filter 301 is desirably at most 30% to 90%, more desirably 40% to 80%, and further desirably 50% to 70% of the cross-sectional area of the absorber 300 in an XY plane. In the present embodiment, the size of each filter 301 is such that the width in the X direction is 12 mm and the depth in the Y direction is 12 mm (40% of the cross-sectional area of the absorber in an XY plane).

Each time the carriage is scanned, the above-described absorbers 300B and 300C receive alternating forces in the scanning direction. In each scan, the liquids held in the absorbers 300B and 300C are shaken in the scanning direction. Accordingly, the pressures on the liquids to be supplied to the channels 400B and 400C change, and these pressure changes may affect generation of bubbles. Such a pressure change increases the larger the amount of shift between the center of gravity of the absorber 300 and the ejection port array 1101 in the scanning direction.

In a case when the cartridge 100 receives a force in the +X direction (the rightward direction in FIG. 11), the ejection port array 1101B is pressurized whereas the ejection port array 1101C is depressurized. In a case when the cartridge 100 receives a force in the −X direction (the leftward direction in FIG. 11), the ejection port array 1101B is depressurized whereas the ejection port array 1101C is pressurized. Thus, whether the ink is pressured or depressurized varies by the ink color. This leads to a possibility of deteriorating the quality of images to be expressed on print media. The pressure which the liquid in each channel receives from the liquid held in the corresponding absorber as above will be referred to as "shake pressure" below.

Note that, in the present embodiment, the absorbers 300A, 300B, and 300C (see FIG. 3) are linearly disposed along the depth direction of the cartridge. This linear arrangement of the absorbers reduces the amounts of shift between the centers of gravity of the absorbers 300B and 300C and the ejection port arrays 1101B and 1101C in the X direction as compared to conventional configurations. This in turn lowers the shake pressures to be applied to the ejection port arrays and thus reduces generation of bubbles. Accordingly, the deterioration in printing quality is reduced.

In order to lower the shake pressure, opposite end portions of the horizontal portion 708 are formed such that the width (the length in the transverse direction) of the end portion farther from the ejection port array is narrower than the width (the length in the transverse direction) of the end portion closer to the ejection port array. Opposite end portions of the horizontal portion 808 are formed such that the width of the end portion farther from the ejection port array is narrower than the width of the end portion closer to the ejection port array. Thus, on the upstream side of the horizontal portion 708 with respect to the flow of the liquid, a narrow portion 1201B that is narrower than the downstream side is provided, thereby lowering the shake pressure. On the upstream side of the horizontal portion 808 with respect to the flow of the liquid, a narrow portion 1201C that is narrower than the downstream side is provided, thereby lowering the shake pressure.

In a case when the widths of the narrow portions 1201B and 1201C are excessively narrow, the flow resistance during the supply of the inks will be high. For this reason, for a channel with a length of about 50 mm, the width is desirably 1 mm or more, more desirably 1.5 mm or more, and further desirably 2 mm or more. Since increasing the widths of the narrow portions will increase the width of the cartridge, the widths are preferably set to 3 mm at maximum.

Also, the effect of the shake pressure becomes greater the longer the path from the absorber 300 to the ejection port array 1101. Thus, only the channel 400C, which is located far from the printing element board, may be provided with the narrow portion 1201C. This decreases the variation in shake pressure among the channels 400A, 400B, and 400C illustrated in FIG. 4 and reduces generation of bubbles.

As described above, in each cartridge, the center positions of gravity of multiple absorbers are disposed linearly in the array direction of the ejection ports in the ejection port arrays. In this way, it is possible to provide a cartridge and a printing apparatus with which an increase in apparatus size can be avoided. It is also possible to reduce generation of bubbles.

In the present embodiment, the horizontal portion 708 is formed such that the width (the length in the X direction) of its base end portion is narrower than the width of its tip portion. The based end portion of the horizontal portion 708 is disposed inside the second accommodation chamber 302B. The horizontal portion 808 is formed such that the width (the length in the X direction) of its base end portion is narrower than the width of its tip portion. The based end portion of the horizontal portion 808 is disposed inside the third accommodation chamber 302C.

The channel 400A is formed under the filter 301A, the channel 400B is formed under the filter 301B, and the channel 400C is formed under the filter 301C (see FIGS. 9A, 9B, and 10). The following description will be given for the channel 400B, but applies similarly to the channels 400A and 400C as well.

Refer to FIG. 7 again. The liquid having passed through the filter 301B enters the second opening portion 709 of the channel 400B through the first opening portion 700. It is desirable to provide the second opening portion 709 around the center of the filter 301 in the X direction to reduce the likelihood of stagnation at the space under the filter 301B.

The space from the first opening portion 700 to the second opening portion 709 is the second reservoir portion 702 for storing bubbles. The width of the second opening portion 709 in the X direction is narrower than the first opening portion 700 to facilitate upward movement of bubbles at the second reservoir portion 702. However, the flow resistance will be high in a case when the width of the second opening portion 709 in the X direction is excessively narrow. For this reason, the width of the second opening portion 709 in the X direction is desirably 10% to 60%, more desirably 10% to 40%, and further desirably 10% to 20% of the width of the filter 301B in the X direction. In the present embodiment, the width of the second opening portion 709 in the X direction is 1.3 mm (10.8% of the width of the filter in the X direction).

FIGS. 13A to 13D are conceptual diagrams for explaining an example of the process of manufacturing each cartridge in the present embodiment. As illustrated in FIGS. 13A to 13D, an in-die shaping technique is used as a way to pour the resin 920 (see FIG. 9B). The in-die shaping technique will be described step by step.

In the present embodiment, a first die 1301 having a profile for forming the channel formation part 306 and a second die 1302 having a profile for forming the box part 307 are used. The first die 1301 is a fixed die, and the second die 1302 is a movable die.

Figures 13A, 13B, 13C, 13D:
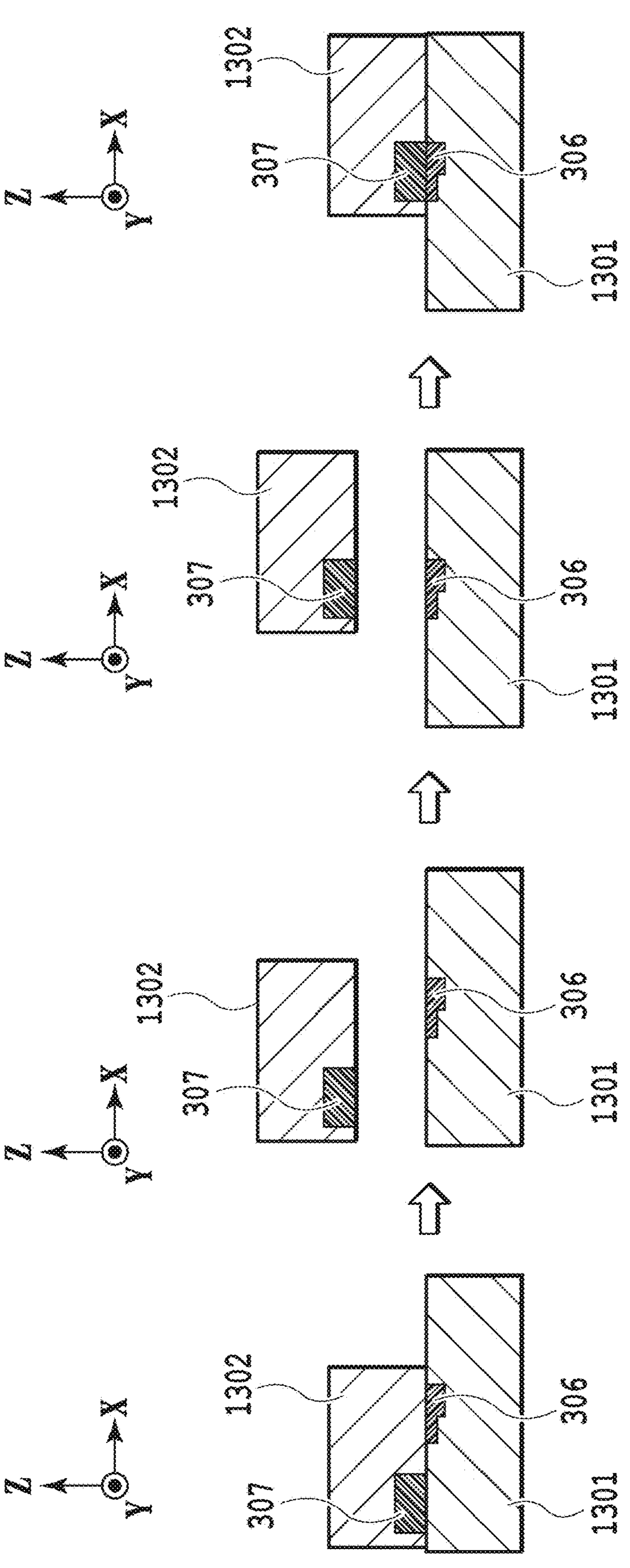
FIG. 13A is a diagram illustrating one example of a method of manufacturing the cartridge in the one embodiment.
FIG. 13B is a diagram illustrating the one example of the method of manufacturing the cartridge in the one embodiment.
FIG. 13C is a diagram illustrating the one example of the method of manufacturing the cartridge in the one embodiment.
FIG. 13D is a diagram illustrating the one example of the method of manufacturing the cartridge in the one embodiment.

First, as illustrated in FIG. 13A, the fixed first die 1301 and the movable second die 1302 are joined to each other, and molding resin is filled into cavities formed by these dies from primary gates disposed in the first die 1301. As a result, the first member forming the channel formation part 306 and the second member forming the box part 307 are molded.

Then, the dies are opened as illustrated in FIG. 13B. As a result, the first member forming the channel formation part 306 remain in the first die 1301, and the second member forming the box part 307 remains in the second die 1302.

Then, as illustrated in FIG. 13C, the second die 1302 is moved to position the second member forming the box part 307 above the first member forming the channel formation part 306, which is remaining in the first die 1301.

Then, as illustrated in FIG. 13D, the second die 1302 is lowered with the position of the channel formation part 306 and the position of the box part 307 aligned with each other to close the first die 1301 with the second die 1302. By closing the first die 1301 with the second die 1302, the first member forming the channel formation part 306, which is remaining in the first die 1301 and the box part 307 remaining in the second die 1302 are disposed inside the dies in a combined state.

Thereafter, the resin 920 (see FIG. 9B) in a melted state is poured in from secondary gates disposed in the first member forming the channel formation part 306 to join the channel formation part 306 and the box part 307. Lastly, the dies are opened again, and the channel formation part 306 and the box part 307 joined to each other are taken out of the dies.

In such an in-die shaping technique, the channel formation part 306 and the box part 307 are molded and joined inside dies. The first member forming the channel formation part 306 and the second member forming the box part 307 are joined inexpensively and accurately.

As described above, in a case when bubbles are generated in the liquids inside the channels in the cartridge in the present embodiment, those bubbles are stored in the first reservoir portions or the second reservoir portions, or both of these. The bubbles stored in these reservoir portions are likely to reach the liquid surface with buoyancy and disappear. Thus, as compared to the conventional technique, the ejection performance can be maintained without having to frequently discharge bubbles along with the liquids. Accordingly, the cartridge of the present disclosure can prevent entry of bubbles into the ejection unit and maintain the ejection performance to a greater extent than the conventional technique. Moreover, each channel includes reservoir portions at some parts such that the degree of freedom in the arrangement of the channel from the corresponding accommodation chamber to the printing element board is higher than the conventional technique. This makes it possible to achieve a thin head cartridge as illustrated in FIG. 2.

Second Embodiment

A second embodiment of the technique of the present disclosure will be described below with reference to drawings. The cartridge in the first embodiment and the cartridge in the present embodiment differ in the arrangement of the accommodation chambers. In the first embodiment, three accommodation chambers are disposed linearly. Unlike this, in the second embodiment, three accommodation chambers are disposed in a T-shape. In the following description, components that are similar or correspond to those in the first embodiment are denoted by the same reference signs and their description is omitted. Differences will be mainly described.

Figure 14A:
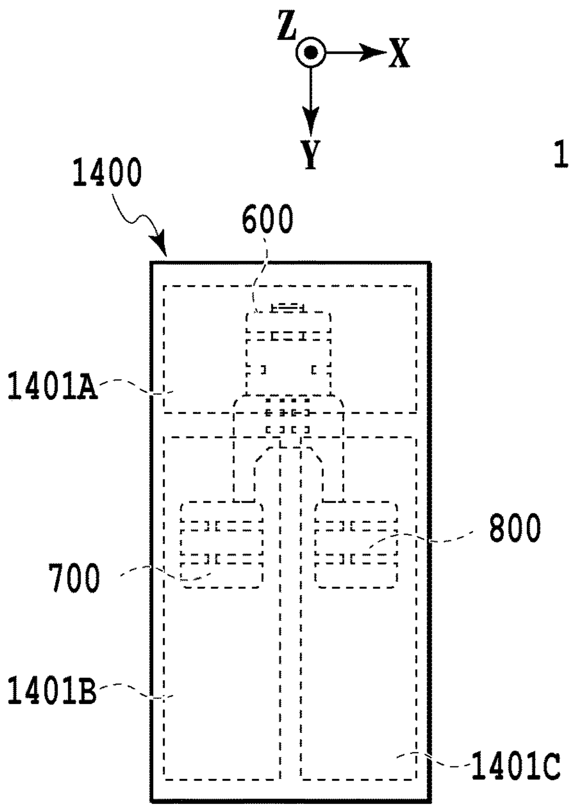
FIG. 14A is a schematic transparent view of the top of a cartridge in one embodiment.
Figure 14B:
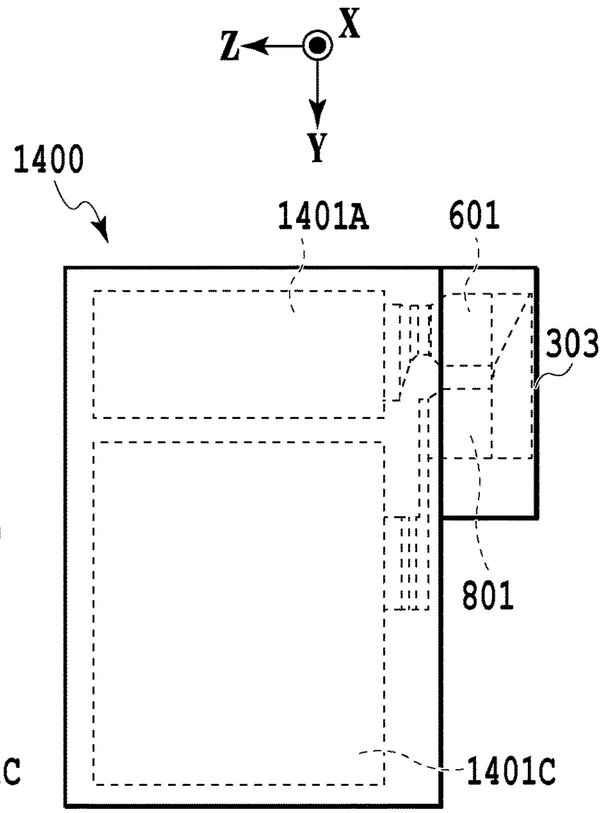
FIG. 14B is a schematic transparent view of a side of the cartridge in the one embodiment.
Figure 14C:
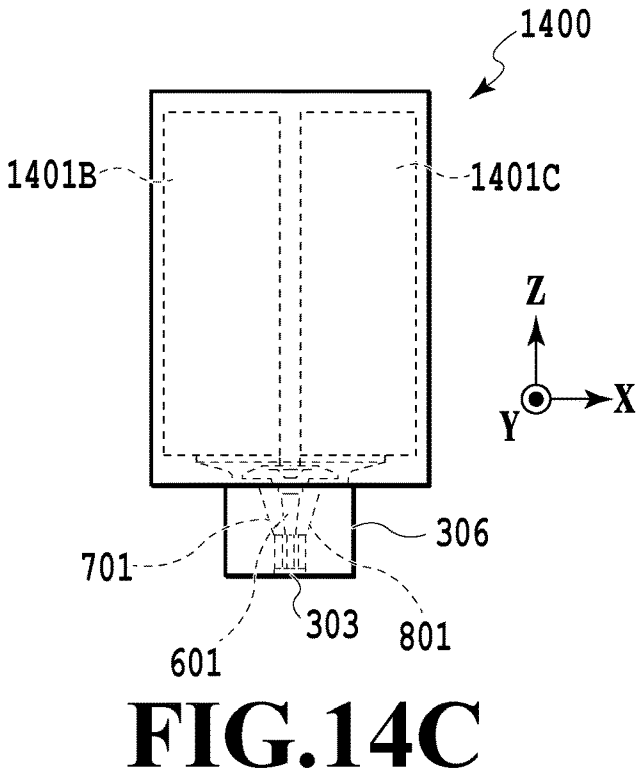
FIG. 14C is a schematic transparent view of the front of the cartridge in the one embodiment.

FIG. 14A is a schematic transparent view of the top of a cartridge 1400 in the present embodiment. FIG. 14B is a schematic transparent view of a side of the cartridge 1400 in the present embodiment. FIG. 14C is a schematic transparent view of the front of the cartridge 1400 in the present embodiment.

As illustrated in FIG. 14A, in the present embodiment, the inside of the cartridge 1400 is separated into a T-shape. Accommodation chambers 1401A, 1401B, and 1401C accommodating liquids of different types are provided in the separated sections, respectively. In the cartridge 1400, the accommodation chambers 1401B and 1401C are arrayed in the width direction of the cartridge 1400 (X direction). The accommodation chamber 1401A is disposed on the back sides of the accommodation chambers 1401B and 1401C (the upper side of FIG. 14A).

A first opening portion 600 is connected to the accommodation chamber 1401A. A first opening portion 700 is connected to the accommodation chamber 1401B. A first opening portion 800 is connected to the accommodation chamber 1401C.

As illustrated in FIG. 14B, a continuous channel is formed from the accommodation chamber 1401A to a printing element board 303. As illustrated in FIG. 14C, a continuous channel is formed from the accommodation chamber 1401B to the printing element board 303. A continuous channel is formed from the accommodation chamber 1401C to the printing element board 303.

Figure 15:
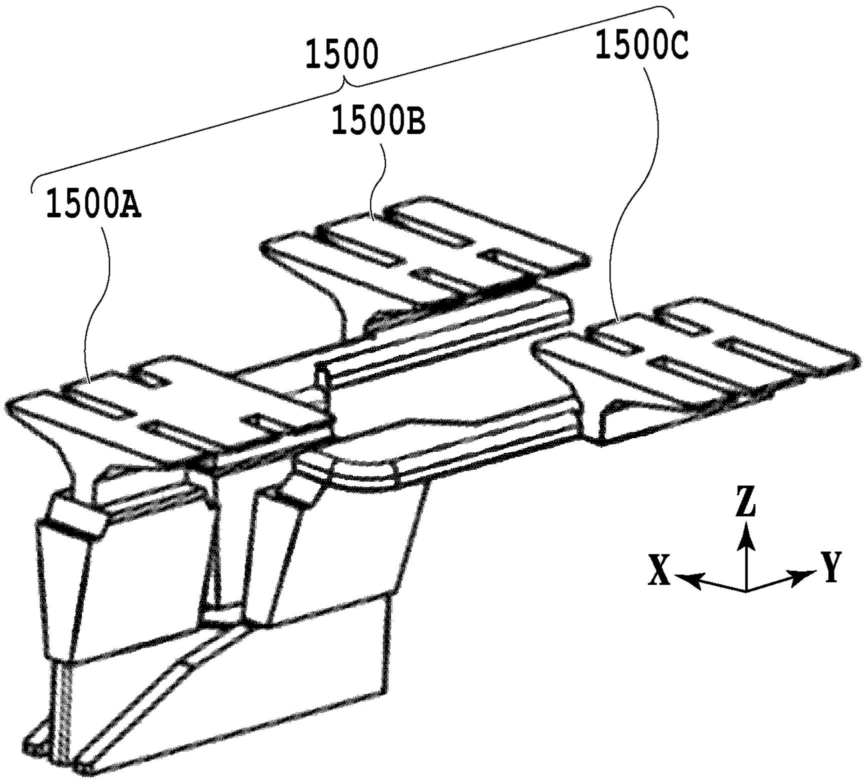
FIG. 15 is a perspective view illustrating one example of channels in the one embodiment.

FIG. 15 is a perspective view of spaces as channels for the liquids inside the case in the present embodiment extracted, modeled, and illustrated as a channel part 1500. The channel part 1500 is a model obtained by extracting the channels for the inks. The channel part 1500 includes channels for three colors (1500A, 1500B, and 1500C). Channels 1500A, 1500B, and 1500C are independent of one another.

Figure 16A:
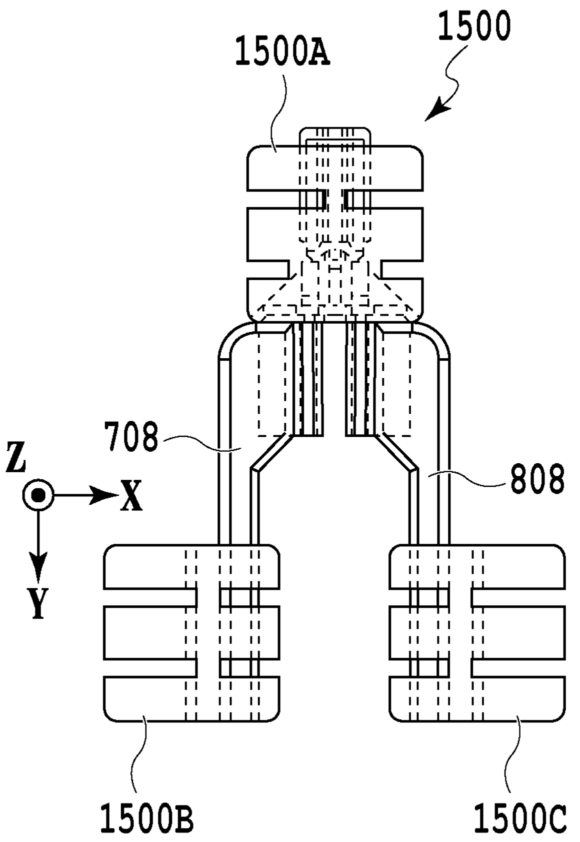
FIG. 16A is a top view of a channel part in the one embodiment.
Figure 16B:
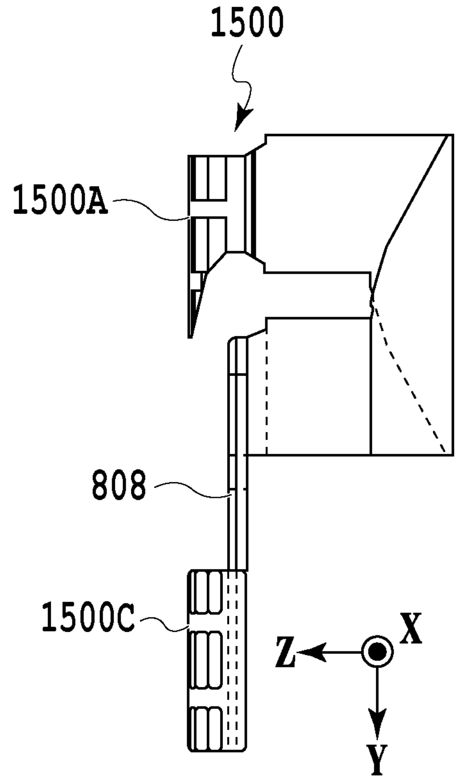
FIG. 16B is a side view of the channel part in the one embodiment.

FIG. 16A is a top view of the channel part 1500 in the present embodiment. FIG. 16B is a side view of the channel part 1500 in the present embodiment.

As illustrated in FIGS. 16A and 16B, the channel 1500A is disposed on the rear side in the depth direction of the cartridge (Y direction). The channels 1500B and 1500C are disposed next to each other along the width direction of the cartridge (X direction) on the front side of the channel 1500A in the depth direction of the cartridge (Y direction) (the lower side of FIG. 16A). The channel 1500B includes a horizontal portion 708. The channel 1500C includes a horizontal portion 808.

Figure 16C:
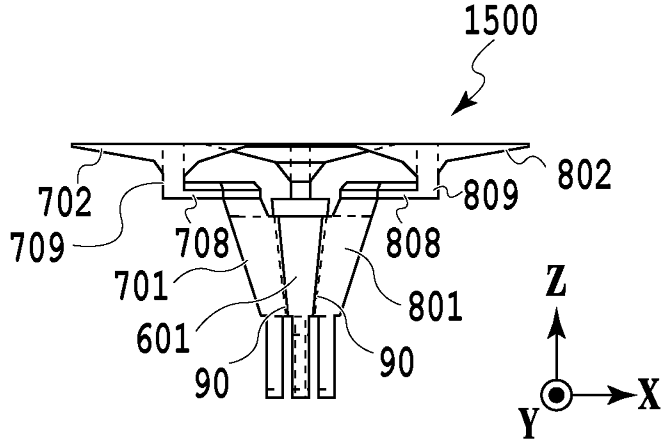
FIG. 16C is a front view of the channel part in the one embodiment.

FIG. 16C is a front view of the channel part 1500 in the present embodiment. As illustrated in FIG. 16C, a first reservoir portion 701 provided near the nozzle array and a second reservoir portion 702 provided near the accommodation chamber are connected through a second opening portion 709 and the horizontal portion 708. A first reservoir portion 801 provided near the nozzle array and a second reservoir portion 802 provided near the accommodation chamber are connected through a second opening portion 809 and the horizontal portion 808.

Such a cartridge in the present embodiment can also prevent entry of bubbles into the ejection unit and maintain the ejection performance to a greater extent than the conventional technique.

Third Embodiment

A third embodiment of the technique of the present disclosure will be described below with reference to drawings. The cartridges in the first and second embodiments and the cartridge in the third embodiment differ in the arrangement of the accommodation chambers. In the first embodiment, three accommodation chambers are disposed linearly. In the second embodiment, three accommodation chambers are disposed in a T-shape. Unlike these, in the third embodiment, four accommodation chambers are disposed in arrays of two. In the following description, components that are similar or correspond to those in the first and second embodiments are denoted by the same reference signs and their description is omitted. Differences will be mainly described.

Figure 17B:
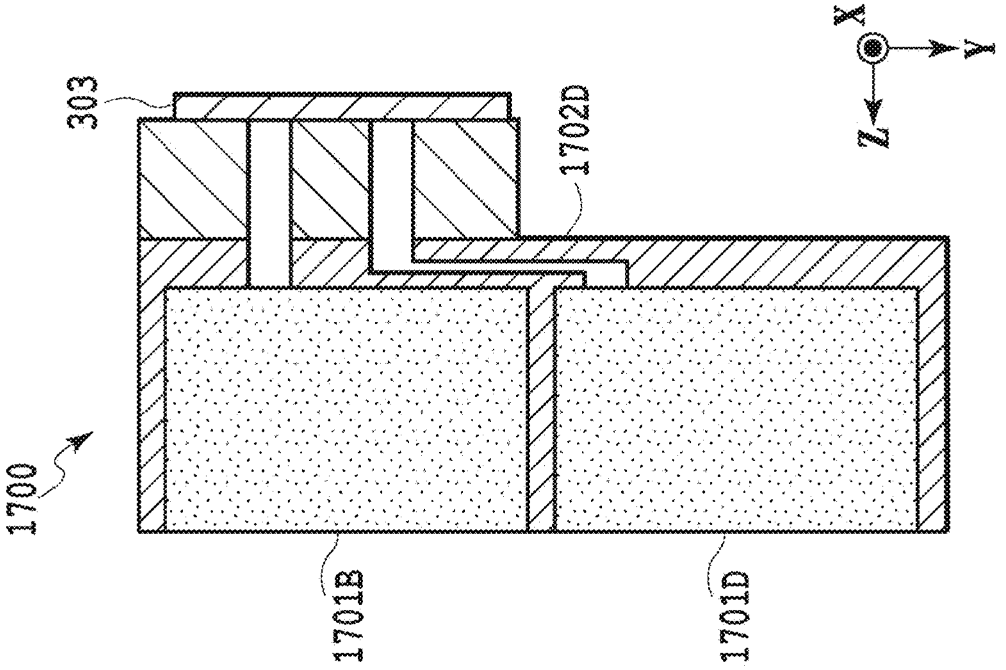
FIG. 17B is a cross-sectional view along the XVII-XVII line in FIG. 17A.
Figure 17A:
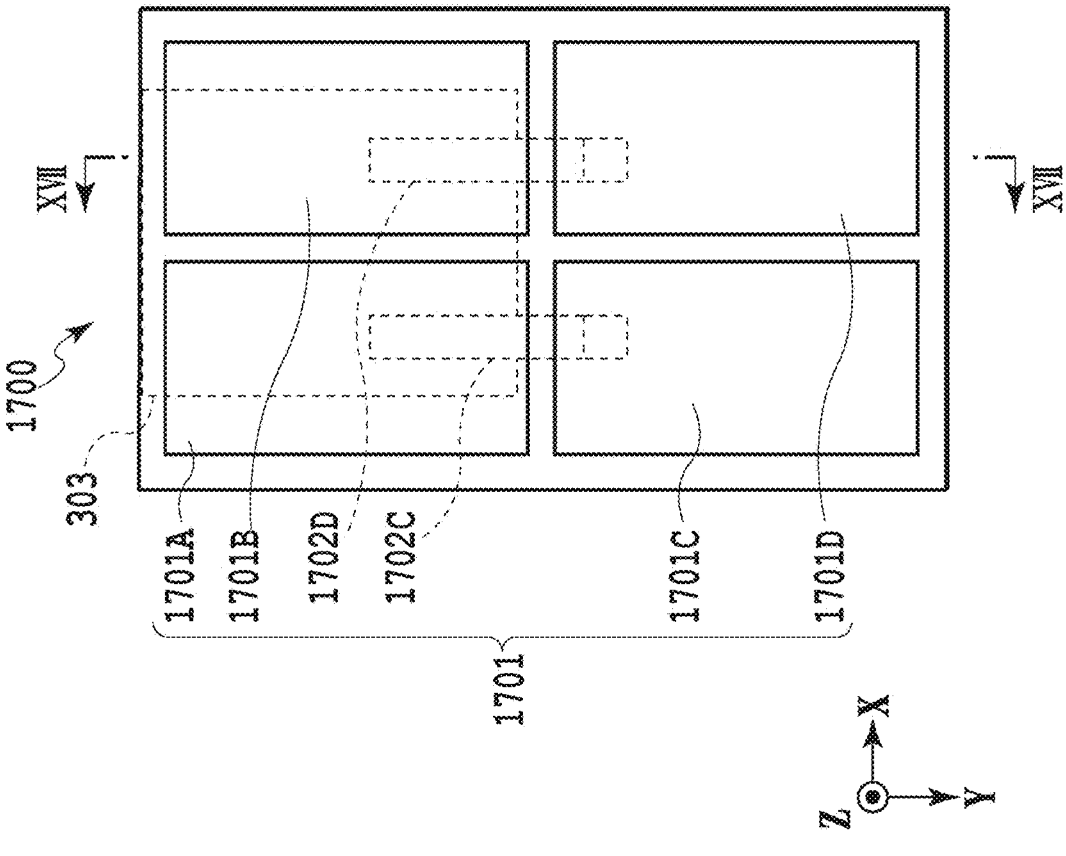
FIG. 17A is a top view illustrating a cartridge in one embodiment.

FIG. 17A is a top view illustrating a cartridge 1700 in the present embodiment. FIG. 17B is a cross-sectional view along the XVII-XVII line in FIG. 17A. As illustrated in FIG. 17A, the inside of the cartridge 1700 is separated into four accommodation chambers in arrays of two. Absorbers 1701A, 1701B, 1701C, and 1701D containing liquids of different types are provided in the separated sections, respectively. For example, the absorber 1701A holds a cyan ink. The absorber 1701B holds a magenta ink. The absorber 1701C holds a yellow ink. The absorber 1701D holds a black ink.

In the cartridge 1700, the absorbers 1701A and 1701B are arrayed in the X direction, which is the width direction. The absorbers 1701C and 1701D are arrayed in the X direction, which is the width direction. The absorbers 1701A and 1701C are arrayed in the depth direction (Y direction). The absorbers 1701B and 1701D are arrayed in the depth direction (Y direction).

In the present embodiment, four ejection port arrays are provided in a printing element board 303. Specifically, an ejection port array 1101D is formed in the printing element board 303 in the present embodiment in addition to the ejection port arrays 1101A, 1101B, and 1101C illustrated in FIG. 11. The liquid in the absorber 1701C is supplied to the printing element board 303 through a horizontal portion 1702C. The liquid supplied from the absorber 1701C to the printing element board 303 is ejected from the corresponding ejection port array (not illustrated). The liquid in the absorber 1701D is supplied to the printing element board 303 through a horizontal portion 1702D. The liquid supplied from the absorber 1701D to the printing element board 303 is ejected from the corresponding ejection port array (not illustrated).

The cartridge in the present embodiment can also prevent entry of bubbles into the ejection unit and maintain the ejection performance to a greater extent than the conventional technique. Accordingly, the cartridge of the present disclosure can prevent entry of bubbles into the ejection unit and maintain the ejection performance to a greater extent than the conventional technique.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. A cartridge mountable to a printing apparatus capable of performing printing by ejecting a liquid onto a print medium, the cartridge comprising:

- a first accommodation chamber capable of accommodating the liquid; and
- a first channel connecting the first accommodation chamber and a printing element board including an element configured to apply energy for ejecting the liquid to the liquid,
- wherein, in a state where the cartridge is mounted to the printing apparatus, the first channel includes:
  - a first horizontal portion extending along a horizontal direction;
  - a first connection portion connected to the printing element board and extending along a vertical direction; and
  - a first reservoir portion capable of storing a bubble, wherein the first reservoir portion has a tapered portion with an opening portion at an upper end thereof in the vertical direction and an opening portion at a lower end thereof in the state where the cartridge is mounted to the printing apparatus, the opening portion at the upper end being larger than the opening portion at the lower end, and,
  - as viewed along an extending direction in which the first horizontal portion extends, a width of the first reservoir portion is larger than a width of the first connection portion,
- wherein the first channel has a second reservoir portion extending along the vertical direction in the state where the cartridge is mounted to the printing apparatus, an area of an opening portion formed at an upper end of the second reservoir portion in the vertical direction is larger than an area of an opening formed at an upper end of the first reservoir portion in the vertical direction, as viewed along the extending direction, a length of the second reservoir portion in the vertical direction is smaller than a length of the first reservoir portion in the vertical direction, the first reservoir portion is disposed between the first connection portion and the first horizontal portion, and the second reservoir portion is disposed between the first horizontal portion and the first accommodation chamber, and
- wherein the second reservoir portion has a tapered portion with an opening portion at an upper end thereof in the vertical direction and an opening portion at a lower end thereof in the state where the cartridge is mounted to the printing apparatus, the opening portion at the upper end being larger than the opening portion at the lower end.

2. The cartridge according to claim 1, wherein the first horizontal portion has an angular portion as viewed along the extending direction in the state where the cartridge is mounted to the printing apparatus.

3. The cartridge according to claim 1, wherein, as viewed from vertically above in the state where the cartridge is mounted to the printing apparatus, a width of an end portion of the first horizontal portion farther from the printing element board is smaller than a width of an end portion of the first horizontal portion closer to the printing element board.

4. The cartridge according to claim 1, wherein the end portion of the first horizontal portion farther from the printing element board is disposed inside the first accommodation chamber.

5. The cartridge according to claim 1, wherein a shape of an opening portion formed at a lower end portion of the second reservoir portion in the vertical direction in the state where the cartridge is mounted to the printing apparatus is a slit shape, and

- a cross-sectional shape of the opening portion formed at the lower end portion of the second reservoir portion in the vertical direction includes an angular portion for at least at a part thereof.

6. The cartridge according to claim 5, further comprising a first filter covering the opening portion formed at the upper end of the second reservoir portion in the vertical direction in the state where the cartridge is mounted to the printing apparatus.

7. A mountable to a printing apparatus capable of performing printing by ejecting a liquid onto a print medium, the cartridge comprising:

- a first member;
- a second member joined to the first member;
- a first accommodation chamber capable of accommodating the liquid, the first accommodation chamber being formed in the first member;
- a second accommodation chamber capable of accommodating the liquid;
- a first channel connecting the first accommodation chamber and a printing element board including an element configured to apply an energy for ejecting the liquid to the liquid, the first channel being formed in the first member and the second member and the printing element board being disposed at a printing-element placement portion formed at the second member; and a second channel connecting the second accommodation chamber and the printing element board to each other, wherein, in a state where the cartridge is mounted to the printing apparatus, the first channel includes:

a first horizontal portion extending along a horizontal direction, the first horizontal portion being formed at portions of the first member and the second member at which the first member and the second member are joined to each other;

a first connection portion connected to the printing element board and extending along a vertical direction; and a first reservoir portion capable of storing a bubble, and, as viewed along an extending direction in which the first horizontal portion extends, a width of the first reservoir portion is larger than a width of the first connection portion, wherein, in the state where the cartridge is mounted to the printing apparatus, the second channel includes:

a second horizontal portion extending along the extending direction;

a second connection portion connected to the printing element board and extending along the vertical direction; and a third reservoir portion capable of storing a bubble, and, as viewed along the extending direction, a width of the third reservoir portion is larger than a width of the second connection portion.

8. The cartridge according to claim 7, wherein a cross section of the second horizontal portion has an angular portion in a view of the second horizontal portion along the extending direction in the state where the cartridge is mounted to the printing apparatus.

9. The cartridge according to claim 7, wherein, as viewed along the extending direction in the state where the cartridge is mounted to the printing apparatus, a shape of the second horizontal portion has a longer length in the vertical direction than a length thereof in a width direction.

10. The cartridge according to claim 9, wherein, as viewed along the extending direction in the state where the cartridge is mounted to the printing apparatus, a width of the second horizontal portion is smaller than a width of the first horizontal portion.

11. The cartridge according to claim 10, wherein, as viewed from vertically above in the state where the cartridge is mounted to the printing apparatus, a width of an end portion of the second horizontal portion farther from the printing element board is smaller than a width of an end portion of the second horizontal portion closer to the printing element board.

12. The cartridge according to claim 11, wherein the end portion of the second horizontal portion farther from the printing element board is disposed inside the second accommodation chamber.

13. The cartridge according to claim 7, wherein the third reservoir portion has a tapered portion with an opening portion at an upper end thereof in the vertical direction and an opening portion at a lower end thereof in the state where the cartridge is mounted to the printing apparatus, the opening portion at the upper end being larger than the opening portion at the lower end.

14. The cartridge according to claim 13, wherein the second channel has a fourth reservoir portion extending along the vertical direction in the state where the cartridge is mounted to the printing apparatus, an area of an opening portion formed at an upper end of the fourth reservoir portion in the vertical direction is larger than an area of an opening formed at an upper end of the third reservoir portion in the vertical direction, as viewed along the extending direction, a length of the fourth reservoir portion in the vertical direction is smaller than a length of the third reservoir portion in the vertical direction, the third reservoir portion is disposed between the second connection portion and the second horizontal portion, and the fourth reservoir portion is disposed between the second horizontal portion and the second accommodation chamber.

15. The cartridge according to claim 14, wherein the third reservoir portion has a tapered portion with an opening at an upper end thereof in the vertical direction and an opening at a lower end thereof in the state where the cartridge is mounted to the printing apparatus, the opening at the upper end being larger than the opening portion at the lower end.

16. The cartridge according to claim 15, further comprising a second partition partitioning an inside of the fourth reservoir portion into a plurality of spaces connected to each other.

17. The cartridge according to claim 16, wherein a shape of an opening portion formed at a lower end portion of the fourth reservoir portion in the vertical direction in the state where the cartridge is mounted to the printing apparatus is a slit shape, and a cross-sectional shape of the opening portion formed at the lower end portion of the fourth reservoir portion in the vertical direction includes an angular portion for at least at a part thereof.

18. The cartridge according to claim 17, further comprising a second filter covering the opening portion formed at the upper end of the fourth reservoir portion in the vertical direction in the state where the cartridge is mounted to the printing apparatus.

19. The cartridge according to claim 7, wherein the first accommodation chamber and the second accommodation chamber are linearly disposed along the extending direction in the state where the cartridge is mounted to the printing apparatus.

20. The cartridge according to claim 7, wherein the first accommodation chamber accommodates a liquid of a first type, and the second accommodation chamber accommodates a liquid of a second type different from the first type.

21. The cartridge according to claim 1, wherein the cartridge is capable of ejecting the liquid while reciprocally moving along a direction crossing the vertical direction and the extending direction in the state where the cartridge is mounted to the printing apparatus.

22. A printing apparatus capable of performing printing by ejecting a liquid onto a print medium, the printing apparatus comprising:

a cartridge; and a mount unit configured such that the cartridge is mountable to the mount, wherein the cartridge includes:

a first accommodation chamber capable of accommodating the liquid; and a first channel connecting the first accommodation chamber and a printing element board including an element configured to apply an energy for ejecting the liquid to the liquid, wherein, in a state where the cartridge is mounted to the printing apparatus, the first channel includes:

a first horizontal portion extending along a horizontal direction;

a first connection portion connected to the printing element board and extending along a vertical direction; and a first reservoir portion capable of storing a bubble, wherein the first reservoir portion has a tapered portion with an opening portion at an upper end thereof in the vertical direction and an opening portion at a lower end thereof in the state where the cartridge is mounted to the printing apparatus, the opening portion at the upper end being larger than the opening portion at the lower end, and, as viewed along an extending direction in which the first horizontal portion extends, a width of the first reservoir portion is larger than a width of the first connection portion, wherein the first channel has a second reservoir portion extending along the vertical direction in the state where the cartridge is mounted to the printing apparatus, an area of an opening portion formed at an upper end of the second reservoir portion in the vertical direction is larger than an area of an opening formed at an upper end of the first reservoir portion in the vertical direction, as viewed along the extending direction, a length of the second reservoir portion in the vertical direction is smaller than a length of the first reservoir portion in the vertical direction, the first reservoir portion is disposed between the first connection portion and the first horizontal portion, and the second reservoir portion is disposed between the first horizontal portion and the first accommodation chamber, and wherein the second reservoir portion has a tapered portion with an opening portion at an upper end thereof in the vertical direction and an opening portion at a lower end thereof in the state where the cartridge is mounted to the printing apparatus, the opening portion at the upper end being larger than the opening portion at the lower end.

23. A cartridge mountable to a printing apparatus capable of performing printing by ejecting a liquid onto a print medium, the cartridge comprising:

a first accommodation chamber capable of accommodating the liquid; and a first channel connecting the first accommodation chamber and a printing element board including an element configured to apply an energy for ejecting the liquid to the liquid, wherein, in a state where the cartridge is mounted to the printing apparatus, the first channel includes:

a first horizontal portion extending along a horizontal direction;

a first connection portion connected to the printing element board and extending along a vertical direction; and a first reservoir portion capable of storing a bubble, wherein the first reservoir portion has a tapered portion with an opening portion at an upper end thereof in the vertical direction and an opening portion at a lower end thereof in the state where the cartridge is mounted to the printing apparatus, the opening portion at the upper end being larger than the opening portion at the lower end, and, as viewed along an extending direction in which the first horizontal portion extends, a width of the first reservoir portion is larger than a width of the first connection portion, wherein the first channel has a second reservoir portion extending along the vertical direction in the state where the cartridge is mounted to the printing apparatus, an area of an opening portion formed at an upper end of the second reservoir portion in the vertical direction is larger than an area of an opening formed at an upper end of the first reservoir portion in the vertical direction, as viewed along the extending direction, a length of the second reservoir portion in the vertical direction is smaller than a length of the first reservoir portion in the vertical direction, the first reservoir portion is disposed between the first connection portion and the first horizontal portion, and the second reservoir portion is disposed between the first horizontal portion and the first accommodation chamber; and a first partition partitioning an inside of the second reservoir portion into a plurality of spaces connected to each other.

* * * * *